United States Patent
Le et al.

(10) Patent No.: US 12,461,595 B2
(45) Date of Patent: *Nov. 4, 2025

(54) SYSTEM AND METHOD FOR EMBEDDED COGNITIVE STATE METRIC SYSTEM

(71) Applicant: Emotiv Inc., San Francisco, CA (US)

(72) Inventors: Tan Le, San Francisco, CA (US); Geoffrey Ross Mackellar, Sydney (AU)

(73) Assignee: Emotiv Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/386,907

(22) Filed: Nov. 3, 2023

(65) Prior Publication Data

US 2024/0061504 A1 Feb. 22, 2024

Related U.S. Application Data

(63) Continuation of application No. 17/160,274, filed on Jan. 27, 2021, now Pat. No. 11,847,260, which is a (Continued)

(51) Int. Cl.
*G06F 3/01* (2006.01)
*G06F 3/0487* (2013.01)
(Continued)

(52) U.S. Cl.
CPC ............ *G06F 3/015* (2013.01); *G06F 3/0487* (2013.01); *G06F 16/24568* (2019.01); *G06F 16/9535* (2019.01)

(58) Field of Classification Search
CPC .. G06F 3/015; G06F 3/0487; G06F 16/24568; G06F 16/9535
See application file for complete search history.

(56) References Cited

U.S. PATENT DOCUMENTS

| 4,421,122 A | 12/1983 | Duffy |
| 5,287,859 A | 2/1994 | John |

(Continued)

FOREIGN PATENT DOCUMENTS

| JP | 2014215963 A | 11/2014 |
| WO | 2004047636 A1 | 6/2004 |

(Continued)

OTHER PUBLICATIONS

Davis, Gene, et al., "Soft, Embeddable, Dry EEG Sensors for Real World Applications", 12th European Conference on Computer Vision, ECCV 2012; [Lecture notes in Computer Science], pp. 269-278, XP047544849.

(Continued)

*Primary Examiner* — Jennifer N Welch
*Assistant Examiner* — Amy P Hoang
(74) *Attorney, Agent, or Firm* — Jeffrey Schox; Annie Imbrie-Moore

(57) ABSTRACT

An embodiment of a method for enabling content personalization for a user based on a cognitive state of the user includes providing an interface configured to enable a third party to request cognitive state data of the user as the user interacts with a content-providing source; establishing bioelectrical contact between a biosignal detector and the user; automatically collecting a dataset from the user; generating a cognitive state metric; receiving a request from the third party for cognitive state data; transmitting the cognitive state data to the third party device; and automatically collecting a dataset from the user as the user engaged tailored content.

19 Claims, 6 Drawing Sheets

Related U.S. Application Data continuation of application No. 16/134,822, filed on Sep. 18, 2018, now Pat. No. 10,936,065, which is a continuation of application No. 15/058,622, filed on Mar. 2, 2016, now Pat. No. 10,108,264.

(60) Provisional application No. 62/127,121, filed on Mar. 2, 2015.

(51) Int. Cl.
*G06F 16/2455* (2019.01)
*G06F 16/9535* (2019.01)

(56) References Cited

U.S. PATENT DOCUMENTS

| | | |
|---|---|---|
| 6,201,982 B1 | 3/2001 | Menkes et al. |
| 6,230,049 B1 | 5/2001 | Fischell et al. |
| 6,801,803 B2 | 10/2004 | Viertioe-Oja |
| 6,954,700 B2 | 10/2005 | Higashida et al. |
| 7,639,145 B2 | 12/2009 | Lawson et al. |
| 7,764,311 B2 | 7/2010 | Bill |
| 7,844,324 B2 | 11/2010 | Saerkelae et al. |
| 7,904,144 B2 | 3/2011 | Causevic et al. |
| 7,933,644 B2 | 4/2011 | Wong et al. |
| 7,962,204 B2 | 6/2011 | Suffin et al. |
| 7,986,991 B2 | 7/2011 | Prichep |
| 8,103,333 B2 | 1/2012 | Tran |
| 8,108,036 B2 | 1/2012 | Tran |
| 8,114,021 B2 | 2/2012 | Robertson et al. |
| 8,137,270 B2 | 3/2012 | Keenan et al. |
| 8,147,419 B2 | 4/2012 | Krauss et al. |
| 8,190,248 B2 | 5/2012 | Besio et al. |
| 8,190,249 B1 | 5/2012 | Gharieb et al. |
| 8,271,075 B2 | 9/2012 | Chuang et al. |
| 8,306,610 B2 | 11/2012 | Mirow |
| 8,583,223 B2 | 11/2013 | Maddess et al. |
| 8,652,040 B2 | 2/2014 | Leboeuf et al. |
| 8,688,209 B2 | 4/2014 | Verbitskiy |
| 8,690,769 B2 | 4/2014 | Edman et al. |
| 8,725,243 B2 | 5/2014 | Dilorenzo et al. |
| 8,838,215 B2 | 9/2014 | John et al. |
| 9,179,854 B2 | 11/2015 | Doidge et al. |
| 9,521,960 B2 | 12/2016 | Lee et al. |
| 9,763,592 B2 | 9/2017 | Le et al. |
| 9,867,548 B2 | 1/2018 | Le et al. |
| 10,028,703 B2 | 7/2018 | Le et al. |
| 10,108,264 B2 | 10/2018 | Le et al. |
| 10,291,977 B2 | 5/2019 | Mackellar et al. |
| 11,531,265 B2 | 12/2022 | Guo |
| 2001/0049480 A1 | 12/2001 | John et al. |
| 2002/0029005 A1 | 3/2002 | Levendowski et al. |
| 2002/0077560 A1 | 6/2002 | Kramer et al. |
| 2003/0055355 A1 | 3/2003 | Vertiö-Oja |
| 2003/0181795 A1 | 9/2003 | Suzuki et al. |
| 2004/0012410 A1 | 1/2004 | Liu et al. |
| 2004/0078219 A1 | 4/2004 | Kaylor et al. |
| 2004/0122703 A1 | 6/2004 | Walker et al. |
| 2004/0137639 A1 | 7/2004 | Miyazaki et al. |
| 2004/0152957 A1 | 8/2004 | Stivoric et al. |
| 2004/0236240 A1 | 11/2004 | Kraus et al. |
| 2004/0249249 A1 | 12/2004 | Lawson et al. |
| 2005/0107723 A1 | 5/2005 | Wehman et al. |
| 2005/0234329 A1 | 10/2005 | Kraus et al. |
| 2005/0240087 A1 | 10/2005 | Keenan et al. |
| 2005/0277826 A1 | 12/2005 | Dunseath |
| 2005/0283053 A1 | 12/2005 | Decharms |
| 2005/0288954 A1 | 12/2005 | McCarthy et al. |
| 2006/0009697 A1 | 1/2006 | Banet et al. |
| 2006/0015034 A1 | 1/2006 | Martinerie et al. |
| 2006/0063980 A1 | 3/2006 | Hwang et al. |
| 2006/0143647 A1 | 6/2006 | Bill |
| 2006/0167350 A1 | 7/2006 | Monfre et al. |
| 2006/0173510 A1 | 8/2006 | Besio et al. |
| 2006/0293921 A1 | 12/2006 | McCarthy et al. |
| 2007/0032737 A1* | 2/2007 | Causevic ............ A61B 5/7264 128/898 |
| 2007/0033634 A1 | 2/2007 | Leurs et al. |
| 2007/0060831 A1 | 3/2007 | Le et al. |
| 2007/0061735 A1 | 3/2007 | Hoffberg et al. |
| 2007/0100246 A1 | 5/2007 | Hyde |
| 2007/0113725 A1 | 5/2007 | Oliver et al. |
| 2007/0150025 A1 | 6/2007 | Dilorenzo et al. |
| 2007/0173733 A1 | 7/2007 | Le et al. |
| 2007/0191727 A1 | 8/2007 | Fadem |
| 2007/0208263 A1 | 9/2007 | John et al. |
| 2007/0219455 A1 | 9/2007 | Wong et al. |
| 2007/0225585 A1 | 9/2007 | Washbon et al. |
| 2007/0238934 A1 | 10/2007 | Viswanathan |
| 2007/0287931 A1 | 12/2007 | Dilorenzo |
| 2007/0293731 A1 | 12/2007 | Downs et al. |
| 2008/0027345 A1 | 1/2008 | Kumada et al. |
| 2008/0103368 A1 | 5/2008 | Craine et al. |
| 2008/0108908 A1 | 5/2008 | Maddess et al. |
| 2008/0146890 A1 | 6/2008 | Leboeuf et al. |
| 2008/0177197 A1 | 7/2008 | Lee et al. |
| 2008/0194981 A1 | 8/2008 | Sarkela et al. |
| 2008/0242946 A1 | 10/2008 | Krachman |
| 2008/0292194 A1 | 11/2008 | Schmidt et al. |
| 2008/0294062 A1 | 11/2008 | Rapoport et al. |
| 2008/0306895 A1* | 12/2008 | Karty .................... G06Q 10/04 703/2 |
| 2009/0018405 A1 | 1/2009 | Katsumura et al. |
| 2009/0024050 A1 | 1/2009 | Jung et al. |
| 2009/0062676 A1 | 3/2009 | Kruglikov et al. |
| 2009/0079607 A1 | 3/2009 | Denison et al. |
| 2009/0083129 A1 | 3/2009 | Pradeep et al. |
| 2009/0105576 A1 | 4/2009 | Do et al. |
| 2009/0131764 A1 | 5/2009 | Lee et al. |
| 2009/0137923 A1 | 5/2009 | Suffin et al. |
| 2009/0163781 A1 | 6/2009 | Say et al. |
| 2009/0163784 A1 | 6/2009 | Sarpeshkar et al. |
| 2009/0214060 A1 | 8/2009 | Chuang et al. |
| 2009/0227876 A1 | 9/2009 | Tran |
| 2009/0247894 A1 | 10/2009 | Causevic |
| 2009/0259137 A1 | 10/2009 | Delic et al. |
| 2009/0292180 A1 | 11/2009 | Mirow |
| 2009/0318779 A1 | 12/2009 | Tran |
| 2009/0318825 A1 | 12/2009 | Kilborn |
| 2010/0004977 A1 | 1/2010 | Marci et al. |
| 2010/0010336 A1 | 1/2010 | Pettegrew et al. |
| 2010/0010364 A1 | 1/2010 | Verbitskiy |
| 2010/0022820 A1 | 1/2010 | Leuthardt et al. |
| 2010/0022907 A1 | 1/2010 | Perez-Velazquez et al. |
| 2010/0042011 A1 | 2/2010 | Doidge et al. |
| 2010/0049004 A1 | 2/2010 | Edman et al. |
| 2010/0069735 A1 | 3/2010 | Berkner |
| 2010/0094155 A1 | 4/2010 | Prichep |
| 2010/0121572 A1 | 5/2010 | Berardi et al. |
| 2010/0147913 A1 | 6/2010 | Corets |
| 2010/0169409 A1 | 7/2010 | Fallon et al. |
| 2010/0172522 A1 | 7/2010 | Mooring et al. |
| 2010/0217100 A1 | 8/2010 | Leboeuf et al. |
| 2010/0286549 A1 | 11/2010 | John et al. |
| 2010/0312188 A1 | 12/2010 | Robertson et al. |
| 2011/0038515 A1 | 2/2011 | Jacquin et al. |
| 2011/0046502 A1 | 2/2011 | Pradeep et al. |
| 2011/0071364 A1 | 3/2011 | Kuo et al. |
| 2011/0087125 A1 | 4/2011 | Causevic |
| 2011/0098112 A1 | 4/2011 | Leboeuf et al. |
| 2011/0172553 A1 | 7/2011 | John |
| 2011/0184247 A1 | 7/2011 | Contant et al. |
| 2011/0196211 A1 | 8/2011 | Al-Ali et al. |
| 2011/0201904 A1 | 8/2011 | Cusimano et al. |
| 2011/0245633 A1 | 10/2011 | Goldberg et al. |
| 2011/0257502 A1 | 10/2011 | Lee |
| 2011/0270117 A1 | 11/2011 | Warwick et al. |
| 2011/0282232 A1 | 11/2011 | Pradeep et al. |
| 2012/0101396 A1 | 4/2012 | Solosko et al. |
| 2012/0108999 A1 | 5/2012 | Leininger et al. |
| 2012/0156933 A1 | 6/2012 | Kreger et al. |
| 2012/0197153 A1 | 8/2012 | Kraus et al. |
| 2012/0265088 A1 | 10/2012 | Snell |
| 2012/0330114 A1 | 12/2012 | Cheung et al. |

(56) References Cited

U.S. PATENT DOCUMENTS

| | | |
|---|---|---|
| 2013/0035579 A1 | 2/2013 | Le et al. |
| 2013/0150686 A1 | 6/2013 | Fronterhouse et al. |
| 2013/0178731 A1 | 7/2013 | Bosl |
| 2013/0317384 A1 | 11/2013 | Le |
| 2014/0038147 A1 | 2/2014 | Morrow |
| 2014/0148657 A1 | 5/2014 | Hendler et al. |
| 2014/0171775 A1 | 6/2014 | Kilsgaard et al. |
| 2014/0223462 A1* | 8/2014 | Aimone ............... A61B 5/369 725/10 |
| 2014/0257073 A1 | 9/2014 | Machon et al. |
| 2014/0316230 A1 | 10/2014 | Denison et al. |
| 2014/0336473 A1 | 11/2014 | Greco |
| 2015/0150753 A1 | 6/2015 | Racette |
| 2015/0216437 A1 | 8/2015 | Mihajlovic |
| 2015/0216439 A1 | 8/2015 | Muraskin et al. |
| 2015/0297109 A1 | 10/2015 | Garten et al. |
| 2015/0327815 A1 | 11/2015 | Hwang |
| 2015/0351655 A1 | 12/2015 | Coleman |
| 2016/0029958 A1 | 2/2016 | Le et al. |
| 2016/0095535 A1 | 4/2016 | Hettrick et al. |
| 2016/0286287 A1 | 9/2016 | Slack |
| 2017/0027466 A1 | 2/2017 | Kerth et al. |
| 2017/0041264 A1 | 2/2017 | Khomami Abadi et al. |
| 2017/0319132 A1 | 11/2017 | Longinotti-Buitoni et al. |
| 2019/0113973 A1* | 4/2019 | Coleman ............... G06F 3/011 |
| 2019/0246982 A1 | 8/2019 | Mackellar et al. |
| 2019/0320979 A1 | 10/2019 | Le et al. |
| 2023/0225659 A1 | 7/2023 | Azemi et al. |

FOREIGN PATENT DOCUMENTS

| | | |
|---|---|---|
| WO | 2009087486 A2 | 7/2009 |
| WO | 2010147913 A1 | 12/2010 |
| WO | 2012021789 A1 | 2/2012 |
| WO | 2014150684 A1 | 9/2014 |
| WO | 2016070188 A1 | 5/2016 |

OTHER PUBLICATIONS

Park, Jeong-Hyeon , et al., "Multiscale Entropy Analysis of EEG from Patients Under Different Pathological Conditions", Fractais 15, 399 (2007). Fractals vol. 15, No. 4 (2007) 399-404.

Srinivasan, Jayarman , et al., "Heart Rate Calculation from Ensemble Brain Wave Using Wavelet and Teager-Kaiser Energy Operator", IEEE (2015).

Stam, Cornelius J., et al., "Nonlinear Synchronization in EEG and Whole-Head MEG Recordings of Healthy Subjects", Hum Brain Mapp. Jun. 2003; 19(2): 63-78, published Mar. 12, 2003.

Warchall, Julian , "A Multi-Channel EEG System Featuring Single-Wire Data Aggregation via FM-FDM Techniques", IEEE International Symposium on Circuits and Systems (ISCAS), May 22-25, 2016. (Year: 2016).

* cited by examiner

SYSTEM AND METHOD FOR EMBEDDED COGNITIVE STATE METRIC SYSTEM

CROSS-REFERENCE TO RELATED APPLICATIONS

This application is a continuation of U.S. patent application Ser. No. 17/160,274, filed 27-Jan.-2021, which is a continuation of U.S. patent application Ser. No. 16/134,822, filed 18-Sep.-2018, which is a continuation of U.S. patent application Ser. No. 15/058,622, filed 2-Mar.-2016, which claims the benefit of U.S. Provisional Application Ser. No. 62/127,121 filed 2 Mar. 2015, each of which are incorporated in their entirety herein by this reference.

TECHNICAL FIELD

This invention relates generally to the biosignals field, and more specifically to a new and useful system and method for enabling personalized content based on analysis of biosignals in the biosignals field.

DESCRIPTION OF THE PREFERRED EMBODIMENTS

The following description of preferred embodiments of the invention is not intended to limit the invention to these preferred embodiments, but rather to enable any person skilled in the art to make and use this invention.

1. Overview.

Figure 1:
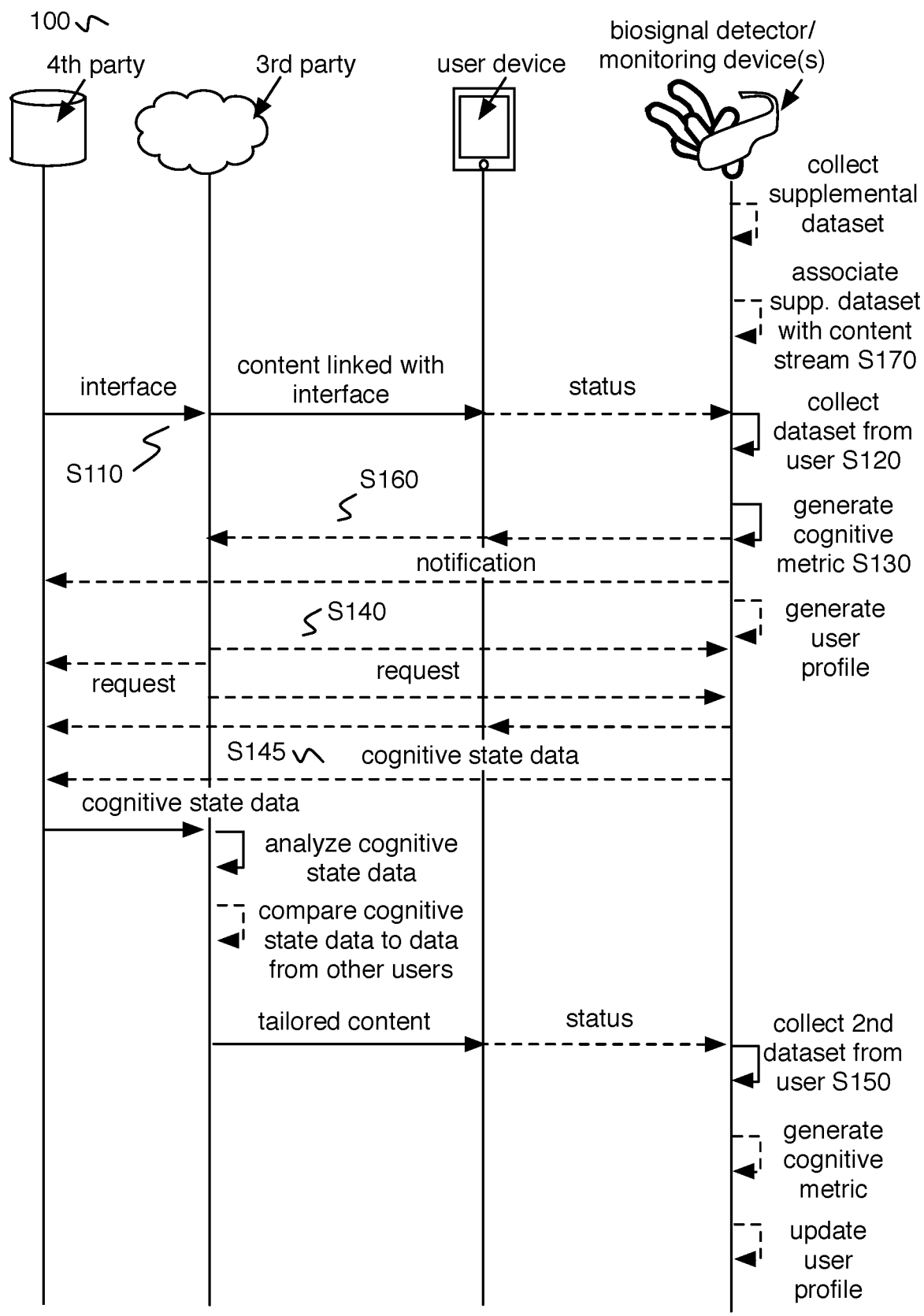
FIG. 1 is a flowchart representation of an embodiment of a method enabling content personalization for a user.
Figure 2:
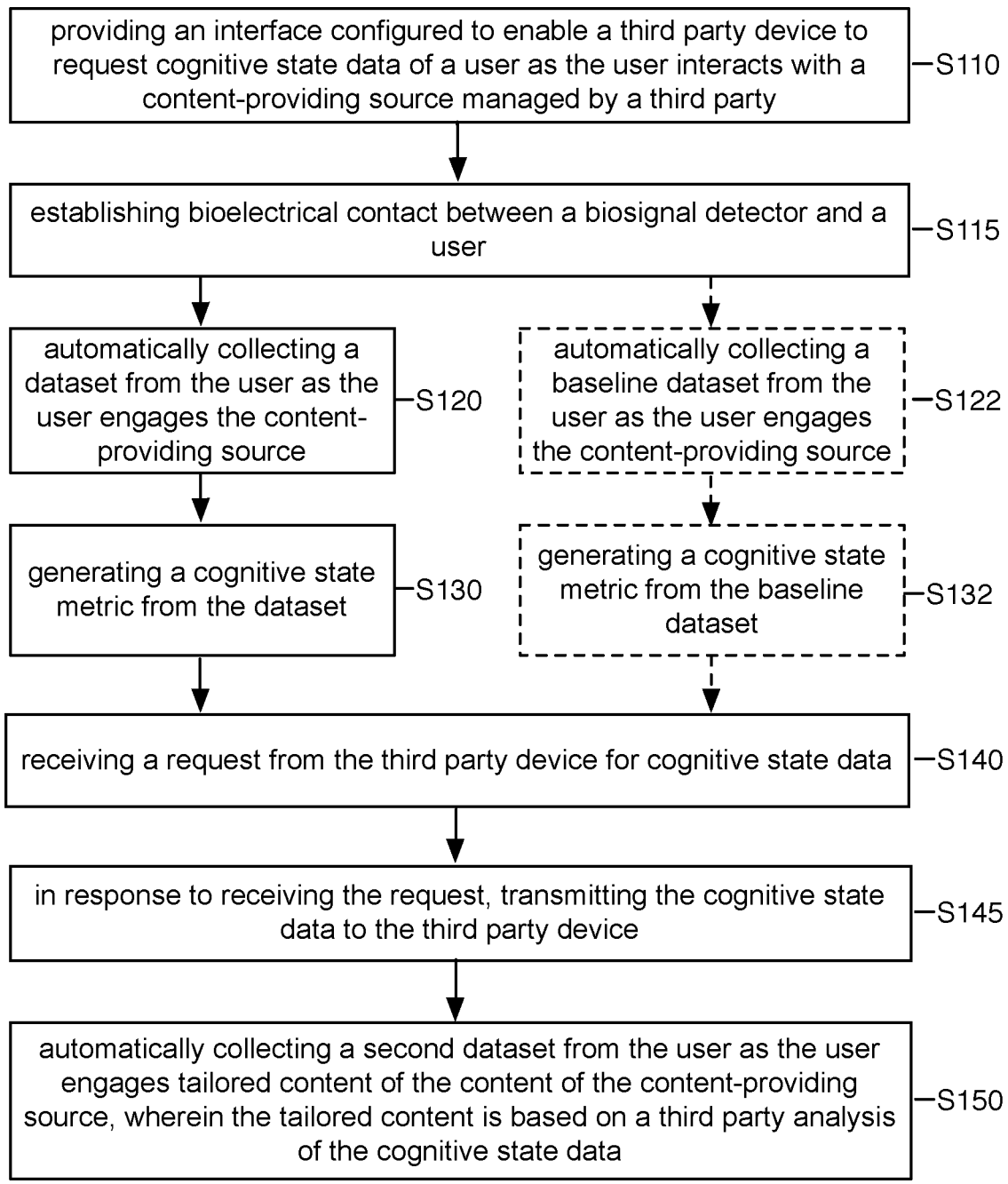
FIG. 2 is a flowchart representation of an embodiment of a method enabling content personalization for a user.

As shown in FIGS. 1 and 2, an embodiment of a method 100 for enabling content personalization for a user based on a cognitive state of the user comprises: providing an interface configured to enable a third party to request cognitive state data of the user as the user interacts with a content-providing source S110; establishing bioelectrical contact between a biosignal detector and the user S115; automatically collecting a dataset from the user S120; generating a cognitive state metric from the dataset S130; receiving a request from the third party for cognitive state data derived from the cognitive state metric S140; transmitting the cognitive state data to the third party device S145; and automatically collecting a dataset from the user as the user engaged tailored content generated by the third party in response to the cognitive state data S150.

The method 100 functions to enable a third party to personalize content delivered to a user based on cognitive state data of the user engaging with the third party content. The method is preferably performed with an embodiment, variation, or example of the system described below, but can alternatively be performed with any other suitable system.

In embodiments, the method 100 can include application of a biosignal detector (e.g., electroencephalogram signal detector) including specific tangible components (e.g., biosignal sensors, motion sensors, processor, communications module, etc.) with specific structure (e.g., specific arrangements of sensors, structure adapted to electrically interface a body region of a user, etc.). Leveraging such structural components, the method 100 addresses needs in the technological fields of digital information creation based on bioelectrical signals, tagging media content streams with cognitive state data, and real-time digital content personalization through wireless communication between a biosignal detector, a user device, and a third party device. Further, the method 100 confers improvements in the functioning of the user devices themselves by providing content tailored to the desires of a user, eliminating power consumption of user devices processing and rendering undesired data.

In particular, the method 100 implements discovered solutions to an issue specifically arising with computer technology, namely the lack of a streamlined mechanism for enabling a third-party to wirelessly request and receive cognitive state user data to be used for serving personalized digital content to the user. The solutions implemented by the method 100 include solutions necessarily rooted in computer technology by: generating objects (e.g., bioelectrical signal data, cognitive state metrics from bioelectrical signal data, etc. etc.) unique to computer technology, and allowing third parties to manipulate the objects (e.g., request and receive cognitive state data, modify and present digital content based on cognitive state data, etc.) in a manner unique to computer technology (e.g., requesting data through an application programming interface, serving content at a wireless user device, etc.).

2. Benefits.

In specific examples, the method 100 can confer several benefits over conventional methodologies for personalization and annotation of digital and non-digital content, some of which are provided below. In specific examples, the method 100 can perform one or more of the following:

First, the method 100 can enable third parties to seamlessly receive and analyze cognitive state information on users' interactions with third party content (e.g., a website, an application, an advertisement, a television show, a movie, a video game, etc.). Facilitating analytics along the dimension of cognitive state can give content creators a deeper understanding of how users react and perceive information served to the user.

Second, content generators can better understand users, and thus, the content generators can optimize content for a user or groups of users based on their cognitive disposition towards different types of content. For example, for users who have had positive emotion states when viewing content relating to movies, content distributors can increase the proportion of movie trailer advertisements served to the user. Third parties can gain the ability to iteratively refine content in accordance with user preferences by presenting content, analyzing user emotions in relation to the content, updating the content based on the user emotions, re-analyzing user emotions, and repeating. With cognitive state data, third parties can deliver specific types of content to induce, avoid, and/or reinforce specific cognitive states of users.

Third, the method 100 can enable third parties or users to efficiently tag content streams (e.g., video streams, social network streams, etc.) with cognitive state data associated with the content stream. For example, athletes can record themselves participating in a sporting event, and the recordings can be tagged with cognitive state data indicating emotions of the athletes at different time points during the sporting event. Users can thus directly capture and associate their emotional experiences with activities they partake in.

Fourth, cognitive state data of users can be enhanced with supplemental data (e.g., motion sensor data, mobile phone data, location, other users, etc.) to obtain a fuller understanding of a user's experience with, for example, an application or website. For example, a user profile can be generated for a user based on their cognitive reactions to different types of media when analyzed in the context of the user's movements, facial expressions, location, comparisons to other user's reactions, etc. Content creators can then direct content to the user based on their user profile.

3. System.

Figure 6:
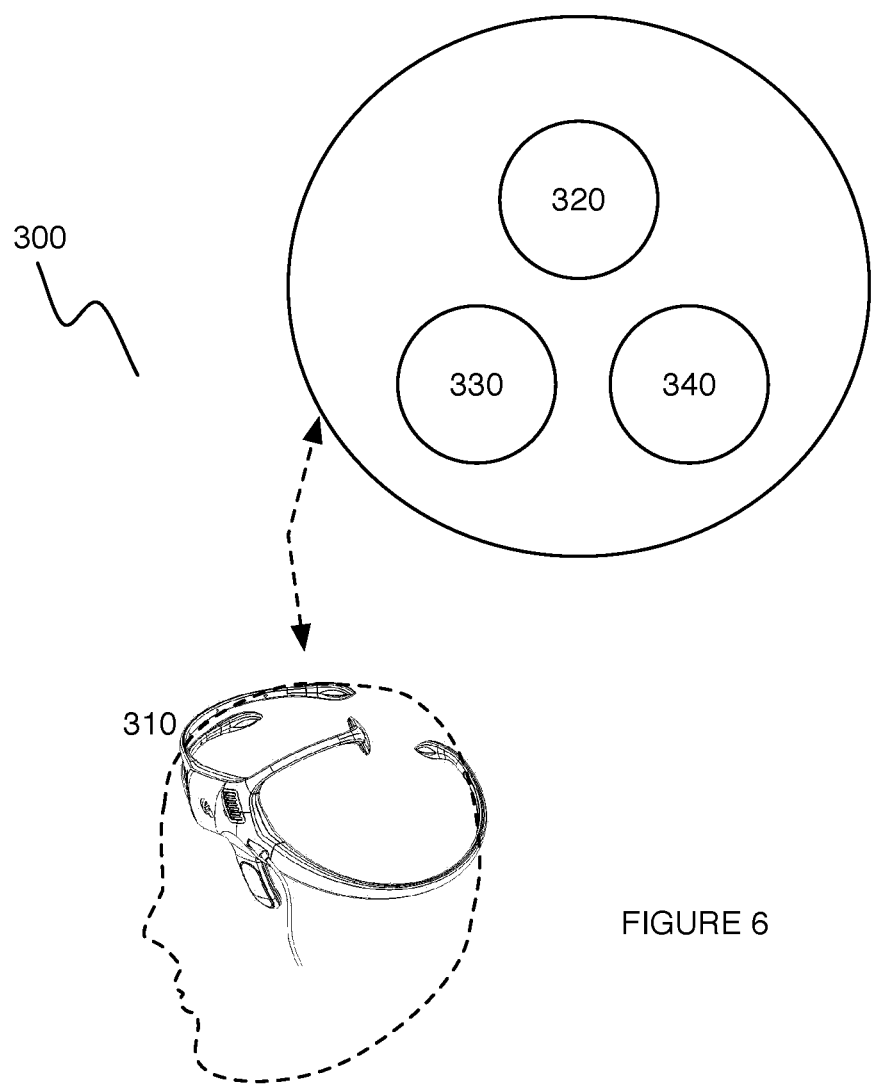
FIG. 6 is a schematic of an embodiment of a system for enabling content personalization for a user based on cognitive state data of the user.

As shown in FIG. 6, an embodiment of a system 300 for providing bioelectrical signal data comprises a biosignal detector 310 including a receiver 320, an analyzer 330, and a communications module 340. In some embodiments, the system 100 can additionally or alternatively include or communicate data to and/or from: an underlying data database (e.g., storing bioelectrical signal data, cognitive state metrics, cognitive state data, supplemental data), user database (e.g., storing user account information, user profiles, devices associated with users, user demographic information, user interaction history with third party content, user preferences, etc.), third party database (e.g., third party account information, content associated with third parties, users associated with third parties, third party permissions to access cognitive state data of users, third party preferences, third party implementations of content with a provided application programming interface, etc.), and/or any other suitable computing system.

Database and/or portions of the method 100 can be entirely or partially executed, run, hosted, or otherwise performed by: a remote computing system (e.g., a server, at least one networked computing system, stateless, stateful), a user device (e.g., a device of a user engaging with third party content), a third party device (e.g., a device of a third party who requests cognitive state data of users interfacing with third party content), a fourth party device (e.g., a device of the manufacturer of the biosignal detector, a device of the entity providing the interface to third parties to retrieve cognitive state data), or by any other suitable computing system.

Devices implementing at least a portion of the method 100 can include one or more of: a biosignal detector, a smartwatch, smartphone, tablet, desktop, or any other suitable device, as described in more detail below. All or portions of the method 100 can be performed by a native application, web application, firmware on the device, plug-in, or any other suitable software executing on the device. Device components used with the method 100 can include an input (e.g., keyboard, touchscreen, etc.), an output (e.g., a display), a processor, a transceiver, and/or any other suitable component, wherein data from the input device(s) and/or output device(s) can be used can also be collected and transmitted to entities for analysis (e.g., to generate tailored content). Communication between devices and/or databases can include wireless communication (e.g., WiFi, Bluetooth, radiofrequency, etc.) and/or wired communication.

The system 300 functions to facilitate collection of bioelectrical signal data (e.g., EEG data) while a user engages in third party content linked with an interface (e.g., an application programming interface) enabling third parties to request and/or receive cognitive state data of the user. The system 300 preferably enables a variation of the method 100 described above, but can alternatively facilitate performance of any suitable method involving collection and analysis of bioelectrical signal data for third parties to leverage in tailoring content delivered to a user.

The biosignal detector 310 functions to collect bioelectrical signal data from a user. The biosignal detector 310 preferably comprises a bioelectrical signal sensor system, wherein the sensor system comprises a plurality of sensors, each sensor providing at least one channel for bioelectrical signal capture. The plurality of sensors can be placed at specific locations on the user, in order to capture bioelectrical signal data from multiple regions of the user. Furthermore, the sensor locations can be adjustable, such that the biosignal detector 310 is tailorable to each user's unique anatomy. Alternatively, the sensor system can comprise a single bioelectrical signal sensor configured to capture signals from a single region of the user. In one example, the biosignal detector can be a personal EEG device, such as the Emotiv Insight neuroheadset, or the Emotiv EPOC neuroheadset, which is shown in FIG. 2. EEG devices are taught in the U.S. Patent Publication Nos. 2007/0066914 (Emotiv) and 2007/0173733 (Emotiv), which are also incorporated in their entirety herein by this reference. In variations, the biosignal detector can be that described in U.S. patent application Ser. No. 13/903,861 filed 28 May 2013, and U.S. patent application Ser. No. 14/447,326 filed 30 Jul. 2014, which are hereby incorporated in their entirety by this reference.

The receiver 320 functions to receive datasets from a single user or multiple users. The receiver can include any number or combination of: bioelectrical signal sensors (e.g., EEG), motion sensors (e.g., accelerometers, gyroscopes), magnetometers, audio sensors, video sensors, location sensors, and/or any suitable type of sensor. Sensors and/or other components of the receiver 320 can receive any size or combination of bioelectrical signal data (e.g., EEG data recorded over time and/or situations, etc.), motion data (e.g., motion along multiple axes, footsteps, facial movement, etc.), audio data (e.g., audio recordings from the user, from the user's environment, etc.), video data (e.g., video recordings by the user, of the user, etc.), physical status data (e.g., heart rate, galvanic skin response, etc.) and/or any suitable type of data. Different types of data can be recorded and/or received simultaneously, in sequence, and/or in any suitable temporal relationship. However, the receiver can record and/or receive any suitable data in determining a user's cognitive state when engaging with content. In variations, the receiver and/or types of data can be that described in U.S. Patent Publication Nos. 2007/0066914 (Emotiv) and 2007/0173733 (Emotiv), U.S. patent application Ser. No. 13/903,861 filed 28 May 2013, U.S. patent application Ser. No. 14/447,326 filed 30 Jul. 2014, and U.S. Provisional No. 62/201,256 field 5 Aug. 2015, which are hereby incorporated in their entirety by this reference.

The analyzer 330 functions to generate an analysis of collected bioelectrical signal data and any other biosignal, biometric, and/or environment data from the user(s), in order to provide the basis for cognitive state data. Additionally or alternatively, the analyzer 330 can function to generate user profiles based on the collected bioelectrical signal data and/or any suitable supplemental data associated with a user's interactions with third party content. However, any suitable user device, third party device, and/or fourth party device can analyze any suitable data in generating cognitive state data for transmission to third parties. In variations, the receiver can be that described in U.S. Patent Publication Nos. 2007/0066914 (Emotiv) and 2007/0173733 (Emotiv), U.S. patent application Ser. No. 13/903,861 filed 28 May 2013, and U.S. patent application Ser. No. 14/447,326 filed 30 Jul. 2014, which are hereby incorporated in their entirety by this reference.

The communications module 340 functions to enable communication between any number or combination of biosignal detectors 310, user devices, third party devices, and/or fourth party device. The communications module 340 can preferably receive and respond to requests from a user device and/or a third party device for cognitive state data of the user. Alternatively, the communications module 340 can transmit cognitive state data to suitable entities independent of any request for the data. However, any suitable component can receive and/or transmit any suitable data to any suitable entity. In variations, the communications module 340 can be that described in U.S. Patent Publication Nos. 2007/0066914 (Emotiv) and 2007/0173733 (Emotiv), U.S. patent application Ser. No. 13/903,861 filed 28 May 2013, and U.S. patent application Ser. No. 14/447,326 filed 30 Jul. 2014, which are hereby incorporated in their entirety by this reference.

4. Data Structures.

Portions of the system 300 and/or the method 100 can be used with a set of data structures. Data structures can include: cognitive state data, supplemental data, rules, and/or any suitable data structure. In a first variation, the types of data structures are predetermined (e.g., by a fourth party, by a third party who defines the format of the data to be requested, by a user, etc.). In a second variation, the data structures are automatically generated. For example, a third-party can define a set of preferences regarding the type of data to be requested regarding a user's interactions with third party content, and the necessary data structures can be created in response to the third-party set of preferences. However, the data structures can be otherwise determined or defined.

4.1 Data Structures: Cognitive State Data.

The cognitive state data can encompass or be derived from any number or combination of data types indicative of user cognitive state, including: bioelectrical signal data, cognitive state metrics, heart rate, galvanic skin response, raw data, processed data, and/or any suitable type of data providing insight to the cognitive status of a user. Cognitive state data can be of any number or combination of forms, including numerical (e.g., a raw score, normalized score, etc.), verbal (e.g., high engagement, low interest, medium frustration, etc.), graphical (e.g., facial graphics displaying the relevant cognitive state, facial graphics representing user facial expressions, colors, etc.), and/or any suitable form.

Figure 4:
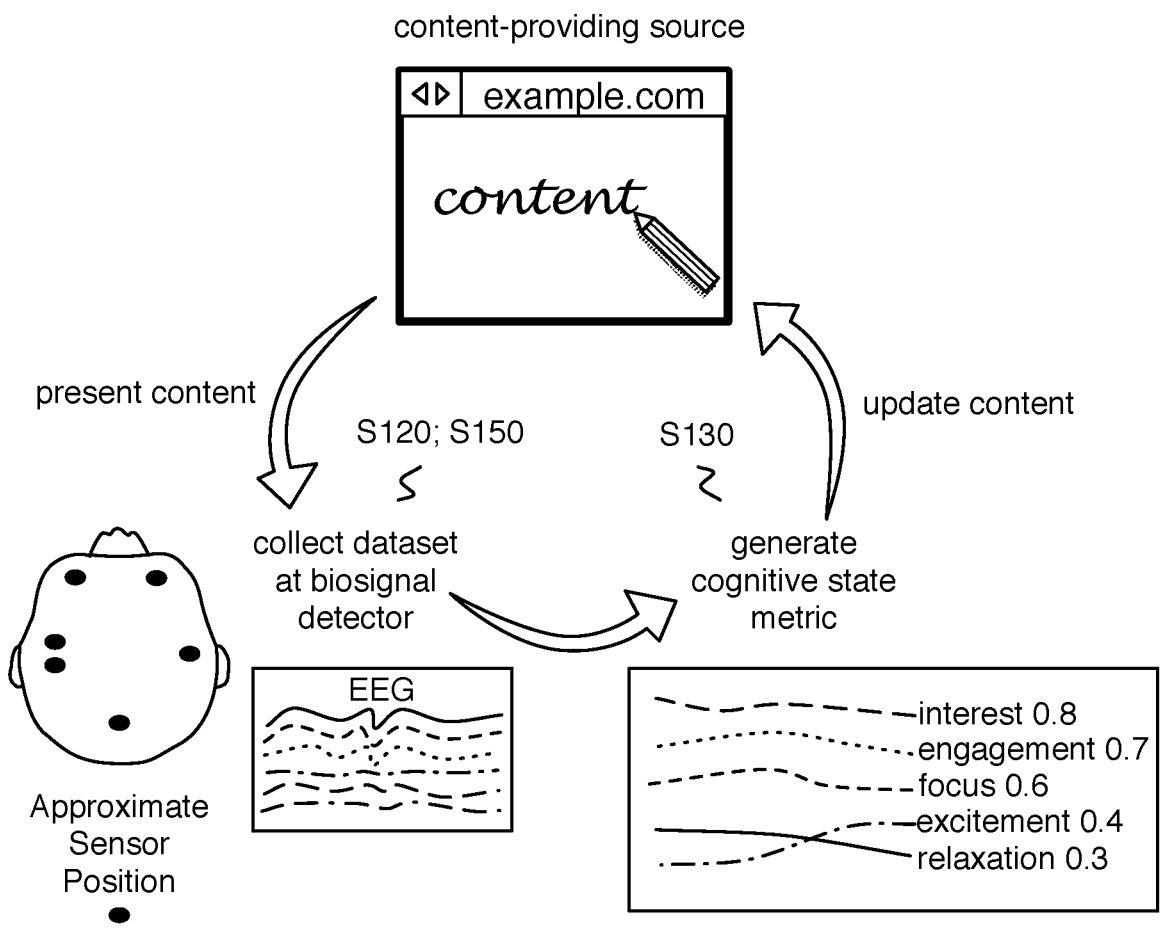
FIG. 4 is a schematic of an embodiment of a method enabling content personalization for a user based on cognitive state data of the user.

Cognitive state data can indicate an emotional state, a cognitive performance state, a facial expression, and/or any suitable characteristic. Examples of emotional state can include: instantaneous excitement, long term excitement, stress, engagement, relaxation, interest, focus, frustration, meditation, and/or any suitable emotional state. Examples of facial expressions include blink, wink, furrow, brow raise, smile, teeth clench, looking in a direction, laughing, smirking, and/or any suitable facial expression As shown in FIG. 4, in a first variation, cognitive state data includes numerical cognitive state metrics measured over time and measured different emotional states of a set of emotional states. For example, based on bioelectrical signal data, cognitive state metrics can be generated across time points for each emotional state of a set of emotional states. As shown in FIG. 4, in a specific example, the set of emotion states includes interest, engagement, focus, excitement, and relaxation, and corresponding cognitive state metrics (e.g., at a current time point, average over time, etc.) can be 0.8, 0.7, 0.6, 0.4, and 0.3, respectively. In a second variation, cognitive state data includes a set of facial expressions that were detected by the biosignal detector over a given time frame. For example, the cognitive state data can indicate that a user smiled at a first time point corresponding to display of website "A" and that a user clenched their teeth at a second time point corresponding to display of website "B". Facial expressions can be ascertained from biosignal sensors and/or motion sensors positioned around a user's facial muscles and/or eyes. Collected data from individual sensors can be associated with the specific muscle groups leading to the collected data, and facial expressions can be identified from such collected data. Additionally or alternatively, facial expressions can be derived from any suitable source of data in any suitable manner. However, cognitive state data can include any suitable data generated in any suitable fashion based on any suitable constituents.

4.2 Data Structures: Supplemental Data.

The supplemental data can include any number or combination of data types, including: user device data, motion data (e.g., from motion sensors of the biosignal detector), contextual data, raw data, processed data, and/or any other suitable type of data. User device data can include: device component characteristics (e.g., battery life, processor speed, display, user interface actions allowed, storage, weight, etc.), user interface actions (e.g., a user's swipe, click, keyboard presses, touch, shake, etc.), sensor data (e.g., GPS location, user device motion sensor data, heart rate sensor data, light sensor data, etc.), content stream data (e.g., recorded media, social network content streams, notification streams, calendar event streams, etc.) and/or any suitable user device data. Contextual data can include: time of day, weather, environmental surroundings, lighting, location, body posture, and/or any suitable contextual data.

4.3 Data Structures: Rules.

Rule formats can include: preferences, selections, restrictions, software code, and/or any suitable rule type. Types of rules can include: cognitive state data rules, supplemental data rules, communication rules, permission rules, and/or any suitable type of rules. Cognitive state data rules and/or supplemental data rules can include rules relating to time (e.g., when to generate cognitive state data, when to generate specific types of cognitive state data, generation in response to which portions of the method 100, etc.), mechanism (e.g., which criteria to based cognitive state generation upon, how to analyze raw data in forming processed cognitive state data, generating cognitive state metrics based on comparisons to which baselines, to which users, what kind of data to generate, etc.), location (e.g., which component and/or device creates the cognitive state data, etc.), and/or any suitable type of cognitive state data rule. Communication rules can include rules for when and/or how to receive, respond, and/or transmit cognitive state data, requests, and/or any suitable type of data. Examples of communication rules include transmitting data over specific communication links (e.g., wireless, wired, etc.), format of responses to requests, when to process requests, etc. Permission rules can include permission levels for third party accounts (e.g., varying access levels to cognitive state data), user accounts (e.g., varying access levels for users to see a third party's cognitive state analysis leading to how content is delivered to the user, etc.). However, any suitable type of rule controlling any suitable aspect of the system 300 and/or method 100 can be determined.

Rules can be set by a fourth party (e.g., a biosignal detector manufacturer, an application programming interface provider, etc.), a third party (e.g., a third party developer, a third party manager of a website and/or application, etc.), a user (e.g., a user of the biosignal detector, a consumer of third party digital content, etc.), and/or any other suitable entity. Additionally or alternatively, rules can be automatically determined (e.g., rules generated based defined preferences of an individual, rules automatically determined in response to constraints of a user device, etc.). However, any suitable entity can employ any suitable process for generating rules. Rules are preferably customizable with respect to users, third parties, fourth parties, and/or associated accounts, such that different entities can have different permission levels in accordance with the entity's role. For example, a user can be given access to set rules regarding how their cognitive state data can be viewed on a user device, while a third party developer can be given access to establish a rule for how frequently to request cognitive state data from a fourth party database storing cognitive state data of users engaging with the third party's content.

Temporally, rules established by third parties are preferably set during implementation of the third party content (e.g., a third party application, website, content source, etc.) with an interface provided to the third party for requesting and receiving user cognitive state data. Additionally or alternatively, rules set by fourth parties can be set upon the release of a version of the interface. Further, rules set by a user can be set upon a user's configuration of a biosignal detector. However, rules set by any suitable entity can be established at any suitable time. Established rules are preferably updatable by any entity given the requisite permission level to modify such rules. Rule updating can be performed at any suitable time.

In a first variation, communication rules are laid for controlling the receipt and/or transmission of cognitive state data. A fourth party preferably controls the potential mechanisms by which a third party can request and/or receive data. For example, with respect to the interface provided to third parties, a fourth party can dictate which types of content (e.g., websites, video games, native applications, etc.) can implement the interface. A third party preferably has a level of control of when cognitive state data is received. For example, a third party can implement the interface with a website such that, after every user session with the website, cognitive state data regarding the user session is requested and received by the third party. A user can preferably control the level of involvement of user devices in communicating cognitive state data. For example, a user can have the option to facilitate communication of cognitive state data to a third party through a wireless communicable link between a third party device and a primary user device rather than a secondary user device. However, any suitable entity can create any suitable communication rule governing the communication aspects of the system 300 and/or method 100.

In a second variation, cognitive state data rules are employed in influencing various aspects of the cognitive state data. A fourth party preferably has permission to define the process in which cognitive state data is generated (e.g., based on what criteria, how the criteria is used, etc.). For example, a fourth party can determine that cognitive state data comprises both cognitive state metrics and supplemental motion data, where the cognitive state data is generated based exclusively on data collected at a biosignal detector. A third party preferably has a level of control over when cognitive state data is generated. For example, a third party can define rules that communicate to a biosignal detector to generate cognitive state data in response to particular user actions (e.g., viewing a specific website, accessing parts of a third party application, clicking on an advertisement, etc.). Users preferably have a degree of control over the types of cognitive state data collected and/or generated, enabling users to establish rules in accordance with their personal privacy preferences. However, any suitable entity can create any suitable cognitive state data rule governing the aspects of the cognitive state data.

5. Method.

As shown in FIGS. 1 and 2, an embodiment of a method 100 for enabling content personalization for a user based on a cognitive state of the user comprises: providing an interface configured to enable a third party to request cognitive state data of the user as the user interacts with a content-providing source S110; establishing bioelectrical contact between a biosignal detector and the user S115; automatically collecting a dataset from the user S120; generating a cognitive state metric from the dataset S130; receiving a request from the third party for cognitive state data derived from the cognitive state metric S140; transmitting the cognitive state data to the third party device S145; and automatically collecting a dataset from the user as the user engaged tailored content generated by the third party in response to the cognitive state data S150. The method 100 can additionally or alternatively include notifying a third party S160, and/or associating biosignal data with a content stream S170.

5.1 Providing an Interface.

Block S110 recites: providing an interface configured to enable a third party to request cognitive state data of the user as the user interacts with a content-providing source S110, which functions to enable an entity to request and/or receive cognitive state data associated with a user engaging with content. Examples of interfaces include one or more of: an application programming interface (API), a web-based interface, an application operable on a third party device, direct access to a cognitive state database storing user cognitive state data, and/or any suitable type of interface. Third parties and/or users can preferably link aspects of the interface with suitable types of content, in order to be able to access cognitive state data of the user corresponding to the user's cognitive state when engaging with the content.

In relation to Block S110, content sourced from the entity(ies) can include one or more of: content from applications (e.g., web applications, apps, native applications, associated advertisements and/or any other suitable type of application or associated content), television, movies, print media (e.g., books, newspapers, magazines, etc.), video games, and/or any other suitable form of content. The content of Block S110 is preferably third party content, but can be provided by a fourth party, by a user, and/or any suitable entity. Third party content and/or fourth party content presented to the user can be modified by the user through, for example, user preferences detected from biosignal data collected at the biosignal detector, manual selection of user preferences, automatic adjustment based on cognitive state data of the user, and/or any suitable user action. Content can be presented at a user device, a biosignal detector, a third party device (e.g., a user visiting a third party brick-and-mortar store and interacting with third party devices presenting content), a fourth party device, and/or any suitable instrument. In a first example, the interface is configured to enable a third party device to request cognitive state data of the user as the user interacts with a third party application managed by the third party. In a second example, a user seeks to assess the user's own cognitive state data generated when the user is engaging in a user's own content. The user can integrate the interface with the user's content in order to record and receive the user's cognitive state data.

In relation to Block S110, a computing system of a fourth party (e.g., Emotiv) preferably provides the interface, which can be implemented by a third party (e.g., web content manager) and/or user. An interface can be provided before, during, after, and/or in response to creation, verification, or logging into a third party and/or user account. Additionally or alternatively, an interface can be provided in response to a request by a third party, provided through distributors in response to requests to distributors by the third party, etc. For example, an interface can be provided through a software development kit downloadable by accounts with requisite permission. The interface can additionally or alternatively be distributed as open source, licensed, through the Internet, through communicable links (e.g., wireless, wired, etc.) with devices, and/or any suitable distribution approach. However, the interface can be provided by any suitable entity in any suitable manner and at any appropriate time.

In Block S110, the interface is preferably configured to allow a content providing source to define the accounts and/or users who will have cognitive state data and/or supplemental data collected and/or generated. Users and/or accounts can be selected based on one or more of: type of content being consumed (e.g., users viewing advertisement "A", accounts accessing a new feature of an application, etc.), demographic information (education, nationality, ethnicity, age, location, income status, etc.), purchase information (purchase history, frequency, amount, bundle subscription status, etc.), social characteristics (social network usage, social network connections, etc.), device usage characteristics (smartphone usage, application usage, etc.), and any other suitable criteria. However, the interface can define any suitable preferences with respect to any suitable data.

A first variation of Block S110 can comprise providing an application programming interface (API) to enable third parties and/or users access to logging and feedback of user cognitive state data as users interact with content linked with the API. The API can include a set of routines, protocols, tools, instructions, and/or any suitable information and/or software. The API is preferably configured to allow a third party to request and/or receive cognitive state data, supplemental data, event logs, and/or any suitable data. For example, a wrapper program can be provided, and individuals can implement the wrapper program with their content providing source (e.g., through including simplified commands of the wrapper program into website code, app code, etc.).

A second variation of Block S110 comprises providing a web interface. The web interface is preferably accessible over the Internet (e.g., through a wireless communicable link) by user or third party accounts with requisite permissions. Permitted accounts can link their account with any suitable content of the content providing source, and accounts can preferably configure any suitable rule at the web interface with respect to content and associated consumers of the content. The web interface can graphically present (e.g., figures, graphs, tables, etc.) cognitive state data, supplemental data, analytics performed on the data, and/or any suitable information. The presented data can be filtered and/or customized based on user information, user device information, content type, contextual parameters (e.g., time of day, location, etc.), and/or any suitable criteria.

A third variation of Block S110 comprises providing a downloadable app. The app can be operable on any suitable device (e.g., third party device, user device, etc.) by any suitable party and/or account with relevant permissions. The app can enable rule configuration, data analysis, and/or any suitable feature of the interface.

5.2 Establishing Bioelectrical Contact.

Block S115 recites: establishing bioelectrical contact between a biosignal detector and the user, which functions to allow the biosignal detector to interface with an individual. Establishing bioelectrical contact is preferably between a biosignal detector and a user, but can alternatively be with a third party and/or any suitable entity. Bioelectrical contact is preferably established through biosignal detector sensors arranged at a particular location or region of the user (e.g., head region, torso region, etc.). After establishing bioelectrical contact, bioelectrical signal datasets and/or supplemental datasets (e.g., motion data from motion sensors at the biosignal detector) can be collected and processed. However, any suitable feature of the biosignal detector can be performed at any suitable time in relation to establishing bioelectrical contact.

In variations, establishing bioelectrical contact in Block S115 can be performed in any manner disclosed in U.S. patent application Ser. No. 13/903,861 filed 28-May-2013, and U.S. patent application Ser. No. 14/447,326 filed 30 Jul. 2014, which are hereby incorporated in their entirety by this reference.

5.3 Collecting a Dataset from the User.

As shown in FIGS. 1-4, Block S120 recites: automatically collecting a dataset from the user S120, which functions to collect data indicative of the cognitive state of the user as the user engages content. The dataset is preferably bioelectrical signal data collected at a biosignal detector coupled to the user engaging in content. Additionally or alternatively, any suitable dataset (e.g., supplemental data, etc.) can be collected at the user device, third party device, fourth party device, ad/or any suitable device. Any number and/or size of datasets can be collected.

Temporally, in Block S120, collecting a dataset is preferably automatically collected as the user engages content (e.g., a third party application) in an interaction. Datasets can be collected before, during, or after providing the interface to a third party, a third party linking the interface with third party content, generating a cognitive state metric, a user interfacing with certain types of content, a particular user action at the interface of the biosignal detector or user device, and/or any suitable event. The timing of when to collect datasets is preferably based upon rules established by a fourth party and/or third party. Additionally or alternatively, a user can select preferences as to the frequency, duration, and timing of dataset collection. In an example, automatically collecting the first bioelectrical signal dataset is in response to detecting a login to a user account associated with the user and the third party content, and where automatically collecting a second bioelectrical signal dataset is in response to a second login to the user account. However, any suitable entity can control any temporal aspect of collecting datasets.

In relation to Block S120, types of interactions with content can include: an introductory interaction (e.g., a users initial interaction with content that has not previously been presented to the user), a repeat interaction (e.g., an interaction with content that the user has previously engaged with), a reference interaction (e.g., a user interaction with reference content), and/or any suitable type of interaction. An interaction can be associated with timeframes corresponding to the entirety or a portion of the user's interaction with the content or portions of the content. For example, an interaction can be associated with the duration that the user is on a particular webpage. However, interactions can be associated with any suitable timeframe.

In a first variation, Block S120 can include collecting biosignal data at a biosignal detector as a user interacts with content of a website provided by a third party. In a specific example of this first variation, the website is preferably linked by a third party with the interface provided to the third party, enabling a third party to request and/or receive biosignal data collected from the user. The user preferably interacts with the website at a user device wirelessly coupled with a biosignal detector, but can engage with the website at an interface of the biosignal detector and/or other suitable device. Biosignal data can be collected from the user as the user engages with specified pages of the website, for the entirety of the user session with the website, when the user performs a specific user interface action with respect to the website (e.g., clicks on a particular link, zooms in on a specific picture, watches an embedded video, etc.), in response to a request transmitted to the biosignal detector from the website or user device, and/or at any suitable timeframe in relation to website engagement. However, biosignal data can be collected in any suitable manner for a user interfacing with the third party website. In an example of this variation, Block S120 can include collecting biosignal data for visitors to a website offering a subscription service. Biosignal data can be collected for the visitors as the visitors go through each step of the sign up process for the subscription service. Thus, visitors' cognitive state can be directly accessed and analyzed as the user goes through each step, in order to enable the website manager to refine steps of the sign up process to produce specific desired cognitive states of new visitors.

In a second variation, Block S120 can include collecting biosignal data at a biosignal detector as the user interacts with content of an app running on a user device. The software code of the app is preferably implemented with the interface provided to the third party, but the app and the interface can be otherwise linked. Data collection can occur as users engage with specific features of the app linked with the interface, but can alternatively occur as the user engages any portion of the app. In a specific example, a user is using a video streaming app operating on the user's smart phone. As different types of videos are watched by the user, Block S120 can include collecting biosignal data from the user to measure a user's cognitive state with respect to the specific videos being watched. The app manager can defined preferences for when or when not to collect data, such as preventing data collection when the user is searching for a video to be subsequently watched.

In a third variation, Block S120 can include collecting biosignal data as a user interacts with a digital advertisement. In this variation, the advertisement can be displayed as the user is engaging other types of content (e.g., a commercial break, an advertisement placed at a website, etc.), but can alternatively be independent from other types of content. Biosignal data is preferably collected during any suitable user interaction with the advertisement, including: clicking on the advertisement, viewing, zooming in, saving, re-playing, changing the video advertisement resolution quality, adjusting the volume of a video advertisement, keystrokes, touch, and/or any suitable interaction with the ad. The user's interactions can be associated (manually, automatically, etc.) with the corresponding portions of the collected biosignal data. In a first example of this variation of Block S120, if a user clicked on an advertisement at timeframe "A," the biosignal data corresponding to timeframe "A" can be linked with the user click based on the common time frame. In a second example of this variation of Block S120, a marketing team associated with a video advertisement could seek a user's first cognitive state at the beginning of the video advertisement, and the user's second cognitive state at the climax of the video advertisement. The relevant portions of biosignal data can be isolated, where the portions correspond to the time points when the user is viewing the beginning and the climax of the video.

5.3.a Collecting a Dataset from the User—Baseline Dataset

As shown in FIGS. 1 and 2, Block S120 can be associated with automatically collecting, at the biosignal detector, a baseline bioelectrical signal dataset from the user S122. In Block S122, a baseline bioelectrical signal dataset is preferably collected as the user engages reference content in a reference interaction. Reference content can be presented to the user in an initial calibration phase of a user using the biosignal detector. Additionally or alternatively, the user can go through a validation and registration phase when the user engages third party content, logs into an account, starts using the biosignal detector, upon request by a third party through the interface, and/or at any suitable time. Collecting a baseline bioelectrical signal dataset in Block S122 can be a threshold requirement before the user can receive tailored content from a third party. Alternatively, collecting the baseline dataset can be omitted, but can otherwise be mandatory or optional with respect to different portions of the method.

The reference content of Block S122 can be configured to induce any suitable type, number, and/or combination of cognitive states in the user. Reference content can include any suitable content type. Reference content can be defined by a fourth party, a third party, the user, and/or any suitable entity. Reference content can be predetermined (e.g., a set of web pages selected by a third party, various types of media defined by a fourth party, etc.), automatically determined (e.g., based on user information, contextual information, selected by a machine learning model generated from user populations, etc.), and/or determined through any suitable manner. For example, reference content can be defined by a fourth party to include a set of videos and/or pictures selected to induce a wide variety of cognitive states in the user. When the user is setting up the biosignal detector, the user can participate in a calibration phase where baseline bioelectrical signal data is collected from the user as the user is presented with the reference content at a user device wirelessly linked with the biosignal detector.

5.4 Generating a Cognitive State Metric.

As shown in FIGS. 1-4, Block S130 recites: generating a cognitive state metric from the dataset S130, which functions to process data in forming a metric indicative of a user's cognitive state. Any number of cognitive state metrics can be generated at the biosignal detector, a user device, a third party device, a fourth party device, and/or any suitable devices. In examples where devices other than the biosignal detector generate the cognitive state metric, bioelectrical signal raw data collected at the biosignal detector can be transmitted to a device, and the device can subsequently process the raw data and/or other suitable data in generating the cognitive state metric. The cognitive state metric of Block S130 preferably indicates a cognitive state of a user when the user is in an interaction with content. The cognitive state metric can be included in cognitive state data (e.g., cognitive state data transmitted to a third party), but can alternatively exclude the generated cognitive state metric.

In Block S130, the cognitive state metric is preferably generated after bioelectrical signal data is collected during a user's initial interaction with content. Additionally or alternatively, the cognitive state metric can be generated after a user's reference interaction with reference content. However, the cognitive state metric can additionally or alternatively be generated in Block S130 before, during, and/or after receiving a third party request for cognitive state data, receiving cognitive state data rules for when and/or how cognitive state metrics are calculated, detecting that a third party has implemented content with the interface provided to the third party for accessing cognitive state data, and/or any other suitable time point.

In a first variation, Block S130 can include generating cognitive state metrics at specified time intervals. The frequency and/or duration of the time intervals can be established by any suitable party associated with the method 100, and can be of any suitable frequency and/or duration. In an example of this variation, a fourth party establishes a cognitive state data rule that cognitive state metrics are generated for every minute of recorded bioelectrical signal raw data. In a second variation, Block S130 can include generating cognitive state metrics when a user engages with content in a particular manner. For example, cognitive state metrics can be generated only for timeframes in which a user is interacting (e.g., when user interface actions are detected) with the third party content. In a third variation, Block S130 can include generating cognitive state metrics in response to cognitive state data rules being satisfied. For example, a third party can set a rule that limits cognitive state metrics from being generated to situations where bioelectrical signal data values exceed established thresholds. However, cognitive state metrics can be generated in Block S130 at any suitable time.

In Block S130, the cognitive state metric is preferably generated based on one or more collected bioelectrical signal datasets. In an example, a baseline cognitive state metric is generated based on the baseline bioelectrical signal dataset collected in Block S122. Generating the cognitive state metric based on the bioelectrical signal dataset can include accounting for noise in the dataset, incorporating supplemental data into the generation of the metric, accounting for rules of how to map raw data to cognitive state metrics (e.g., rules established by a third party, by a fourth party, etc.), leveraging machine learning models, comparing collected biosignal data with previously collected data for the user, comparing collected biosignal data with data collected from other users, and/or any suitable processing step. For example, supplemental motion sensor data can be collected at a biosignal detector as the user engages the content, and the bioelectrical signal data can be supplemented by the motion sensor data in deriving a cognitive state metric. After generating the cognitive state metric, the metric can be associated with types of user interactions with the content (e.g., associating the cognitive state metric with a user interface action at a user device presenting content engaged in by the user, where the cognitive state data comprises the association between the cognitive state metric and the user interface action. However, the cognitive state metric can be associated with any suitable aspect of the user, third party, content, and/or other component.

In variations, the cognitive state metric of Block S130 can indicate and/or include any one or more of: emotional state (instantaneous excitement, long term excitement, stress, engagement, relaxation, interest, focus, frustration, meditation, etc.), a cognitive performance state (e.g., working memory capacity, long-term memory capacity, execution, mindfulness, etc.), a facial expression (blink, wink, furrow, brow raise, smile, teeth clench, looking in a direction, laughing, smirking, etc.), and/or any suitable characteristic.

In a first variation of this aspect, Block S130 can include calculating cognitive state metrics based on the history of collected bioelectrical signal data for a given user. In this variation, bioelectrical signal data can be collected at different biosignal sensors of the biosignal detector, and a mapping of the values of the bioelectrical signal data can be applied to map to association cognitive state metrics. For example, high values of EEG signals at sensors proximal the frontal lobe can map to higher cognitive state metrics for specific emotions. Rules establishing the mapping between biosignal raw data and cognitive state metrics can be established by any suitable party. Cognitive state metrics generated in this variation of Block S130 can be scaled based on historical patterns of collected biosignal data for the user. Historical patterns can be extracted based on biosignal values, the content that was being engaged with the biosignal values were recorded, contextual information, and/or any suitable criteria. Self-scaling of cognitive state metrics can include comparison of collected biosignal data with collected baseline biosignal data (e.g., collected when the user was engaging reference content, collected during a validation and registration phase for the user, etc.).

In a second variation of this aspect, Block S130 can additionally or alternatively include scaling cognitive state metrics with respect to other users. Collected biosignal data for a user can be compared and analyzed with respect to a group of users defined by any suitable party. In this variation, defining a scaling user group for scaling can be based on type of content being consumed, demographic information, purchase information, social characteristics, device usage characteristics, contextual information, and/or any other suitable criteria. For example, a scaling user group can be defined based on user age associated with user accounts linked with a third party website, and cognitive state metrics can be generated based on comparison of bioelectrical signal data of a user relative to other users of similar age. Expected bioelectrical signal data values can be determined for specific values of specific emotions, and the expected values can vary according to scaling user group. Comparing users within a scaling user group to calculate a cognitive state metric enables a third party to directly compare cognitive state metrics collected across different users of the scaling user group. For example, a cognitive state metric of "0.7" in "focus" for a first user of a scaling user group can be compared against a cognitive state metric of "0.4" in "focus" for a second user of the scaling user group, and a third party can appropriately compare the two metrics in inferring that the first user had a higher focus level when engaging in the corresponding third party content. However, determining cognitive state metrics based on multiple users can otherwise be performed.

In a third variation of this aspect, Block S130 can include applying a machine learning model can to various types of input data in order to output an appropriate cognitive state metric indicating the cognitive state of a user at a given timeframe. A training sample for a training sample set can include a set of features and a label indicative of an aspect of the cognitive state metric (e.g., a cognitive state metric value, a specific emotion, etc.). Training samples can be manually labeled (e.g., users can associate biosignal data corresponding to a first time frame with types and levels of cognitive states that the user subjectively felt during the first time frame, etc.), automatically labeled, and/or otherwise determined. Features can include: bioelectrical signal data, supplemental data, contextual data, and/or any other suitable feature with a consequential effect on a cognitive state metric. In a specific example, users of a biosignal detector undergo a calibration phase, where biosignal data is collected for the user as the user engages in reference content. The user is asked to indicate (e.g., through a survey) how they felt with respect to their cognitive state during the reference interaction. The data collected can be used as a feature set and a label for a training sample of a training sample set (e.g., generated from multiple user data) upon which a machine learning model can be generated. However, machine learning can otherwise be incorporated in determining a cognitive state metric and/or any suitable data of the method 100.

This variation and/or any other suitable step employing machine learning can utilize one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. Each processing portion of the method 100 can additionally or alternatively leverage: a probabilistic module, heuristic module, deterministic module, or any other suitable module leveraging any other suitable computation method, machine learning method or combination thereof.

5.5 Receiving a Request.

Block S140 recites: receiving a request from the third party for cognitive state data derived from the cognitive state metric S140, which functions to receive a communication from a device requesting cognitive state data. A request can be received from a third party device, a user device, a fourth party device and/or any suitable component. The request can be received at a biosignal detector, a fourth party database, a remote server, and/or at any suitable location. In a first variation, Block S140 can include leveraging (e.g., through third party content) the communication ability of the user device accessing the third party content to transmit a request to the biosignal detector for cognitive state data. In a second variation, Block S140 can include, directly requesting (e.g., by a third party device) cognitive state information from a biosignal detector, a fourth party database, and/or any suitable component.

Block S140 can include receiving a request through a wireless communicable link between devices (e.g., Bluetooth, WiFi, etc.), a wired communicable link, and/or any suitable connection between devices. Further, receiving a request can require that a specific type of communicable link be present between two devices (e.g., requests will only be allowed a Bluetooth connection between a biosignal detector and a user device on which content is presented). Received requests can be logged, stored, transmitted to other devices, and/or undergo any suitable processing step by any suitable component.

In Block S140, requests are preferably received through the interface provided in Block S110, but can be enabled through any suitable component. Requests can be of any form, including: an API request, directly accessing a database, a request at a web interface, a request from an associated app, and/or any suitable form. A third party and/or user can request any suitable amount or combination of cognitive state data, supplemental data, contextual data associated with a user engaging in content of the third party and/or user. In an example, a third party device requests cognitive state data comprising a baseline cognitive state metric and a non-baseline cognitive state metric of the user. The data retrievable by request can differ based on permission level, third party information, user information, content characteristics and/or any suitable criteria. However requests can embody any suitable characteristic.

In a first variation, Block S140 can include implementing (e.g., within third party content) mechanisms enabling a third party to request cognitive state data. In this variation, requests for cognitive state data can be initiated and received during a user's interactions with the content of the content providing source. For example, requests can be initiated by software code implemented within the third party content (e.g., with code implemented with website code, app code, etc.), such that when a user interacts with the third party content, execution of the software code at the user device can include transmission of a request for cognitive state data. Request and receipt of cognitive state data during a user session with content allows a third party to personalize content delivered to the user during the same user session. However, mechanisms for enabling individuals to request data can be linked with content in any suitable fashion.

In a second variation, Block S140 can include initiating (e.g., by a third party) requests for cognitive state data independent of the content delivered to the user. Cognitive state data for a user interaction with content can be recorded, processed, and/or stored in anticipation of future requests by a third party for such cognitive state data. For example, cognitive state data captured across multiple users, timeframes, and/or interactions with different types of content can be collected and stored before receiving a request by a third party for the entirety of the cognitive state data. However, mechanisms for initiating requests can be implemented in any suitable fashion with any suitable component.

5.6 Transmitting Cognitive State Data.

Figure 3:
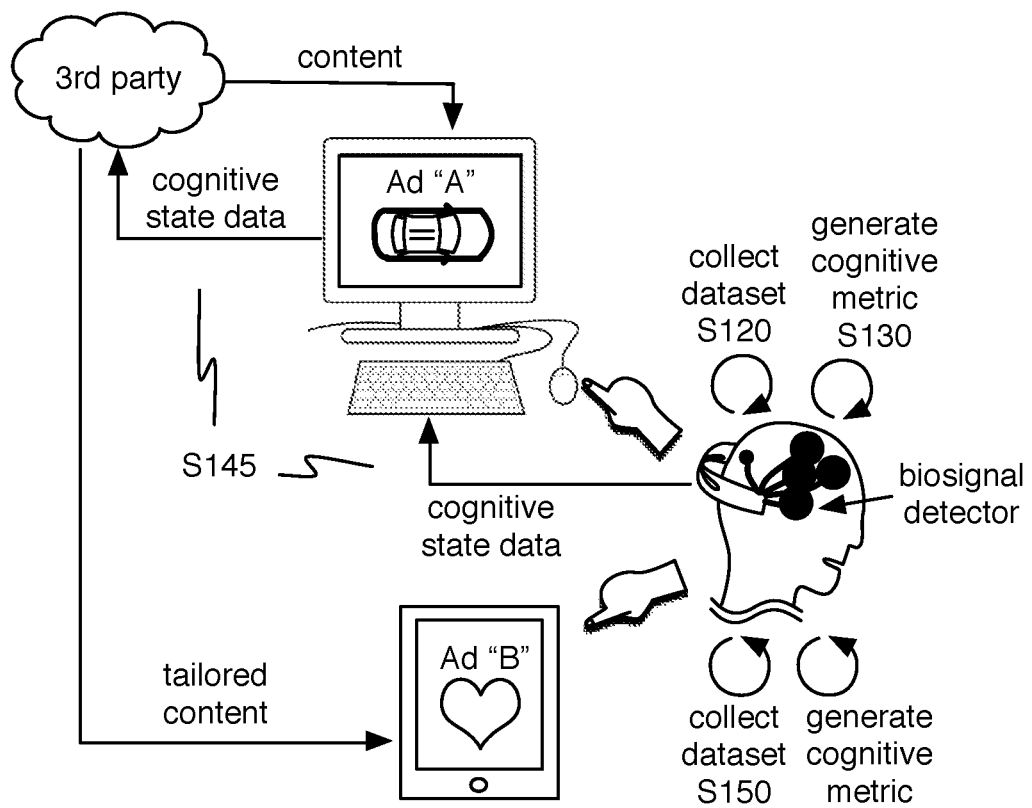
FIG. 3 is a schematic of an embodiment of a method enabling a third party to personalize content based on cognitive state data of a user

As shown in FIGS. 1-3, Block S145 recites: transmitting the cognitive state data to the third party device S145, which functions to deliver cognitive state data indicating a user's cognitive state as the user engages with content. Cognitive state data is preferably transmitted by a user device, but can additionally or alternatively be transmitted by a biosignal detector, a fourth party device, and/or any suitable device. For example, cognitive state data can be generated by a biosignal detector in wireless communication with a user device, the biosignal detector can transmit the cognitive state data to the user device, and the user device can transmit the cognitive state data to a third party requesting the data. However, any suitable entity can transmit and/or receive cognitive state data through any suitable communication link between components.

Transmitting cognitive state data in Block S145 is preferably performed in response to receiving a request in Block S140, but can additionally or alternatively be performed before, during, and/or after generation of cognitive state data, users performing certain user interface actions, a threshold amount of cognitive state data has been collected (e.g., after a day of cognitive state data has been collected, after specified types of cognitive state data has been generated, etc.), and/or at any suitable time.

In Block S145, the transmitted cognitive state data can include cognitive state metrics, supplemental data, associations between cognitive state data and content (e.g., tags that associate cognitive state metrics to certain portions of content), raw data (e.g., raw bioelectrical signal data), processed data, analysis (e.g., summaries of what the cognitive state data indicates regarding a user's interaction with content, comparisons of different users' cognitive states while viewing the same content), and/or any suitable data. Determination of the type, amount, form, and/or other aspect of transmitted cognitive state data can be predetermined (e.g., by a fourth party, by a third party, etc.), automatically determined (e.g., derived from third party selected preferences, based on a machine learning model, etc.), and/or otherwise determined.

In a first variation, Block S145 can include communicating cognitive state data based on temporal criteria. For example, cognitive state data can be transmitted to a third party immediately after receiving a request from the third party for the cognitive state data. In another example, cognitive state data is transmitted at regular time intervals (e.g., every hour, every day, every week, etc.), and/or at certain times of day (e.g., during night time, during non-waking hours, etc.). In a second variation, transmission can be based on established communication rules. For example, cognitive state data can be transmitted after a threshold amount of data has been collected for a given number of users. In another example, cognitive state data is communicated only from and/or to particular devices. In a third variation, cognitive state data is transmitted when the transmitting user device has a sufficient user device characteristic. For example, cognitive state data transmission can require a particular communication link with a third party device, a threshold state-of-charge, a required amount of free memory, and/or any suitable user device characteristic.

5.7 Collecting a Dataset from a User Engaging Tailored Content.

As shown in FIGS. 1-4, Block S150 recites: automatically collecting a dataset from the user as the user engaged tailored content generated by the third party in response to the cognitive state data S150, which functions to collect data indicative of the cognitive state of the user as the user engages content modified for the user. Collecting the dataset S150 is preferably performed after transmitting cognitive state data to a third party who has analyzed the data and modified content delivered to the user in accordance with the analysis. Additionally or alternatively, the dataset can be collected as a user engages content tailored to the user independent of third party analysis of cognitive state data. However, the dataset can be collected at before, during, and/or after any suitable portion of the method 100. For example, upon detection that the user is engaging the third party application in a second interaction, the third party application presenting tailored content to the user based on processing of the baseline cognitive state metric and the first cognitive state metric: automatically collecting, at the biosignal detector, a second bioelectrical signal dataset can be performed. Collecting the dataset S150 can be performed within a same and/or different user session as when untailored content of the content providing source was present. For example, datasets can be collected corresponding to the first and the second user interactions within a same user session with the content-providing source, where the first interaction is with unmodified content, and the second interaction is with tailored content. As such, collecting a dataset S150 and/or other portions of the method 100 can be performed in real-time, non-real time, or in any suitable fashion. The dataset collected can correspond to data collected for the entire duration of the user engaging with the tailored content, and/or for a portion of the user interaction. However, collecting the dataset S150 can be performed at any suitable time.

Similar to Block S120, in Block S150, collected data can include: bioelectrical signal data, supplemental data, contextual data, and/or any suitable form of data as a user engages in an interaction with tailored content. The types of data collected as the user engaged with tailored content can be the same or different from the types of data collected as the user engaged with unmodified content, reference content, and/or any other suitable content. For example, bioelectrical signal data can be collected for a user's initial interaction with a third party video game. The third party can analyze the bioelectrical signal data, update the content delivered to the user in the video game, and for subsequent user interactions with the modified content, a more comprehensive cognitive state dataset (e.g., including bioelectrical signal data, cognitive metrics, supplemental data, etc.) can be recorded and/or generated to more fully assess the effect of the tailored content on the user. Between and/or within user interactions with the content, the collected data can differ or remain substantially similar across any suitable dimension of the data (e.g., size, type of associated content, type of data), user (e.g., different types of data for different users, etc.), and/or other component. However, data collected during a user's interfacing with tailored content can include any suitable data characteristic.

Collecting the dataset in Block S150 is preferably performed at a biosignal detector (e.g., collecting bioelectrical signal data, motion sensor data, etc.), but can be performed at a user device (e.g., collecting supplemental data as the user engaged the tailored content), and/or any suitable component.

In a first variation, Block S150 can include leveraging cognitive state data in selecting suitable types of modified data for inducting, reinforcing, avoiding, and/or otherwise affecting emotional state. In a first example of the first variation, the cognitive state of the user is a negative emotional state associated with a user's first interaction with content from a content providing source, and the tailored content is tailored to induce a positive emotional state of the user (e.g., through choosing a brighter color palette to present the content, through avoiding content that induced a negative emotional state in the user, etc.). In a second example of the first variation, the method 100 can further include generating an emotion improvement metric based on the dataset collected for a user engaging in tailored content, where the emotion improvement metric indicates emotional state improvement (e.g., defined by specific cognitive state metrics, by improvements with specific desired emotions, etc.) from the first interaction (e.g., interaction with unmodified content) to the second interaction (e.g., interaction with tailored content). In a specific example of the first variation, a web application includes a set of features, and cognitive state of a user indicates that the user has more favorable cognitive states when interacting with a specific feature of the application versus other features. In subsequent logins to the user account, tailored information regarding new updates to the specific feature can be presented to the user (e.g., as opposed to updates concerning other features of the set of features).

Figure 5:
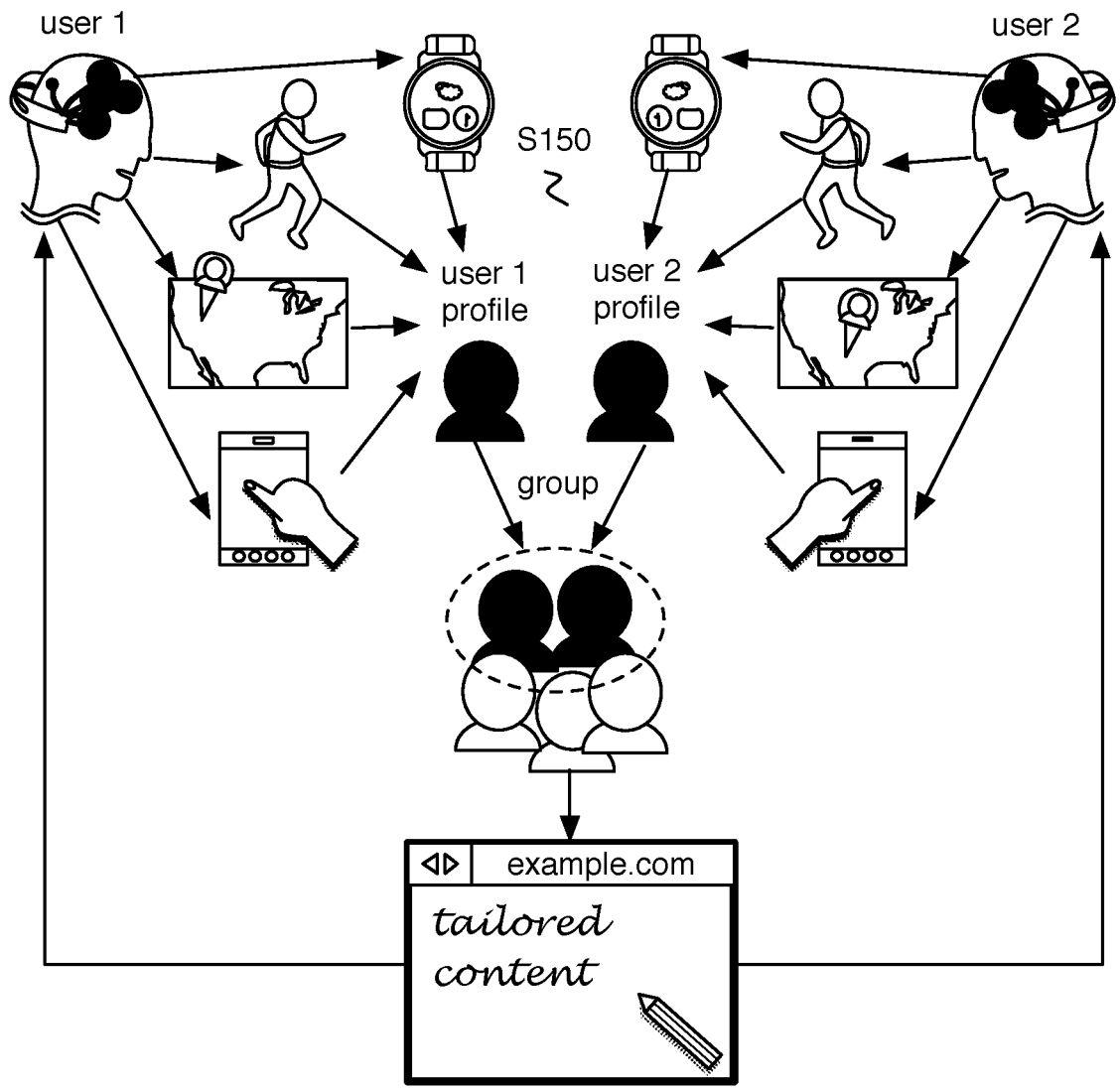
FIG. 5 is a schematic of an embodiment of a method enabling content personalization for a user based on data from multiple users.

As shown in FIG. 5, in a second variation, Block S150 can include generating user profiles for users. A user profile preferably aggregates data of different types captured across multiple instances corresponding to multiple time frames in order to comprehensively indicate a user's cognitive state with respect to different aspects of content. User profiles can be generated based on cognitive state data collected for different types of content (e.g., different types of content of a third party, types of content across third parties, etc.), supplemental data, contextual data, comparisons with other user data, and/or any suitable type of data. For example, additional bioelectrical signal datasets can be collected for a user as the user engages different third party applications. User profiles can be generated by a third party (e.g., a third party device), a fourth party (e.g., a fourth party remote server, etc.), users themselves (e.g., at a user device, at a biosignal detector, etc.), and/or any suitable entity and/or component. User profiles can be transmitted, received, stored, and/or otherwise manipulated. For example, the method 100 can additionally or alternatively include storing a user profile generated based on a baseline bioelectrical signal data (e.g., collected from a user's reference interaction), a first bioelectrical signal dataset (e.g., collected from a user's initial interaction with third party application "A"), a second bioelectrical signal dataset (e.g., collected from a user's repeat interaction with third party application "A" where tailored content was presented), and a third bioelectrical signal dataset (e.g., collected from a user's interaction with third party application "B"), and subsequent content delivered to the user (e.g., by a third party associated with third party application "A", "B", or any other third party application) can be based on the user profile.

In a third variation, Block S150 can include collecting bioelectrical signal datasets for multiple users engaging with content tailored based on analysis of cognitive state data of multiple users. As shown in FIG. 5, for example, content can be tailored for a user group defined based on similar cognitive state data (e.g., similar cognitive states associated with engagement with similar content, similar cognitive state metric values generally, similar facial expression in reaction to types of content, etc.), dissimilar cognitive state data, user demographic information, contextual information, user profiles, and/or any suitable type of criteria. Defining user groups can be predetermined (e.g., manually determined by a third party, fourth party, etc.), automatically determined (e.g., by a machine learning model, by rules established by a party, etc.), and/or otherwise determined. In one example, collecting bioelectrical signal datasets for multiple users can include: automatically collecting, at a second biosignal detector (e.g. a biosignal detector different from a first biosignal detector associated with a first user), a first additional bioelectrical signal dataset from a second user as the second user engages the content; generating an additional cognitive state metric (e.g., in addition to a cognitive state metric associated with the first user) based on the first additional bioelectrical signal dataset; and in response to receiving a second request (e.g., a request different from a first request by a third party for cognitive state data of the first user) from the third party device for additional cognitive state data comprising the additional cognitive state metric, transmitting the additional cognitive state data to the third party device. In the example, the method 100 can additionally or alternatively include content tailored for a user group comprising the first and the second users, the user group defined by the third party based on the cognitive state metric and the additional cognitive state metric. Additionally, the method 100 can additionally or alternatively include automatically collecting, at the biosignal detector, a second additional bioelectrical signal dataset from the second user as the second user engages the tailored content. However, any suitable datasets can be collected for multiple users in any suitable fashion.

In Block S150, types of tailored content can include: modified website content, advertisements, news, social media, e-mails, broadcast media (e.g., television, radio, etc.), application content, video gaming, etc.). Tailoring of content is preferably performed by a third party, but can be performed by a fourth party, a user, and/or other suitable entity. Content personalization is preferably influenced by a user based on user preferences, user tagging of content (e.g., a user tagging a social media post with a positive cognitive state), user thoughts (e.g., specific user desires inferred from bioelectrical signal data collected from the user by the biosignal detector), and/or other suitable user criteria. Content tailoring is preferably preformed at the third party device administering the content, but can also be performed by other suitable entities.

Content tailoring in Block S150 is preferably based on analysis of cognitive state data associated with a user's interaction with unmodified and/or reference content. The analysis associated with providing tailored content can include comparing cognitive state data with user baselines (e.g., baseline cognitive state metrics, baseline bioelectrical signal data, etc.), comparing cognitive state metrics captured at different timeframes, processing with supplemental data and/or content stream data, employing machine learning models (e.g., based on values of the cognitive state data, selecting certain forms of advertising known to have induced certain cognitive states of the user, etc.), applying thresholds (e.g., if a cognitive state metric exceeds a threshold value for user excitement with the reference content, then deliver similar content to the reference content, etc.), and/or any suitable analysis approach. For example, content can be tailored based on processing a supplemental dataset comprising at least one of sensor data of a user device associated with a third party application, a user interface action at the user device, and motion sensor data collected at the biosignal detector as the user engages the third party application in the a first interaction (e.g., an interaction with untailored content.). However, any suitable entity can modify content delivered to a user in any suitable fashion.

In a first variation, Block S150 can include tailoring website content to a user based on cognitive state data. Website text content, advertisements, media assets (e.g., video, images, etc.), features, possible user interfacing options (e.g., allowing users to zoom, click, enter text, etc.), and/or any suitable website content can be customized for a user. Modified website aspects can be delivered in real-time (e.g., within a same user session with the website) or in non-real time (e.g., delivered at a repeat interaction between the user and the website). In a specific example, a news website can receive cognitive state data of a user's cognitive state as the user reads specific articles published on the news website in an initial interaction between the user and the website. An analysis of the cognitive state data can be performed (e.g., by an individual associated with the news website, by a fourth party, etc.) to determine emotional states of the user's during the initial interaction. Based on the analysis, the front page of the website can be tailored to present news articles specific to the user's inclinations for certain types of articles, where the inclinations are inferred from the analysis. Third parties managing websites can compare user cognitive state data across multiple users, across multiple websites, across different types of website content presented to users, and/or perform any suitable analytics at a fourth party web interface provided to the third party, at a fourth party app, and/or at any suitable component. However, website content can be modified in any suitable fashion by any suitable entity.

In a second variation, Block S150 can include tailoring the content of an app running on a user device. App features, potential user interaction, affect on the device running the app, and/or any suitable app content can be tailored for a user. In a specific example, a video game app can modify the difficulty level of the video game app based on user's cognitive state data during play of the video game. Beginner aspects (e.g., introductory levels of a video game, basic actions that can be performed by a player in the video game, etc.) of the video game can be presented to a player, and cognitive state data can be collected and/or generated as the user engages with the beginner aspects. The cognitive state data can be analyzed to asses the comfort level of the user with the beginner aspects, and the subsequent difficulty of the video game content delivered to the user can be adjusted based on the cognitive state data (e.g., increasing difficulty level for video game users with low engagement cognitive state metrics, decreasing difficulty level for video game users with cognitive state metrics indicating high frustration, etc.). However, any suitable app content for any suitable type of app can be tailored in any suitable fashion based on the cognitive state data.

In a third variation, Blocks S150 can include tailoring advertisement content with respect to a user. Advertisement form (e.g., images, videos, text, etc.), product (e.g., tangible goods, intangible goods, media, types of goods, etc.), duration, frequency, interactivity (e.g., interactive, non-interactive, etc.) and/or any suitable advertisement content characteristic can be tailored to a user. In a specific example, advertisements showcasing automobiles can be presented to a user, and based on cognitive state data associated with the user's viewing and/or interacting with the advertisement, subsequent advertisements presented to the user can be tailored based on the analysis of the cognitive state data. A first user's cognitive state data, when compared to other users of similar demographic, can show a relative increase in affinity when viewing automobile advertisements. Further, the cognitive state data can indicate an increased engagement when viewing video-based automobile advertisements versus image-based automobile advertisements. Based on this analysis, an increased amount of video-based advertisements showcasing automobiles, transportation, mechanical goods, and/or other concepts related to automobiles can be presented to the user in subsequent interactions. However, advertisement content can otherwise be modified in any suitable fashion.

5.8 Notifying.

Block S160 recites: notifying an entity S160, which functions to notify a user and/or a third party of information concerning cognitive state data. Notifications can include information regarding cognitive state data (e.g., amount of cognitive state data received, presence of generated cognitive state data, cognitive state data readiness to be transmitted to third parties, type of cognitive state data generated, etc.), supplemental data (e.g., user device data corresponding to a user's engagement with content, etc.), communication data (e.g., receipt of a request, progress of a transmission of cognitive state data to a third party, etc.), events (e.g., presence of a new user from which cognitive state data can be generated, etc.), and/or any other suitable type of information. A fourth party entity (e.g., a fourth party remote server, a fourth party biosignal detector) preferably generates the notification, but any suitable entity can generate and/or transmit the notification. A third party at a third party device is preferably notified by wireless communication of the notification to the third party device, but a user and/or other suitable entity can be notified.

In relation to Block S160, notifying an entity S160 can include notifying an entity based on rules (e.g., notification rules set by a third party and/or user influencing the manner and content of notification), time (e.g., notification at set frequencies, times of day, etc.), and/or other criteria. For example, a third party can be notified when thresholds are exceeded for cognitive state metrics, raw data, and/or other types of data. In a specific example, notifying a third party device can be in response to the difference between the baseline cognitive state metric and the cognitive state metric exceeding a threshold.

In a first variation, Block S160 can include implementing a push configuration in notifying, where notifications are pushed to third party and/or user devices irrespective of requests by the party receiving the notifications. In a first example, a biosignal detector can generate cognitive state data indicating a user cognitive state satisfying certain rules (e.g., a happiness metric exceeding a threshold when browsing a particular website), a notification indicating user satisfaction can be generated and transmitted to the user device (e.g., a smartphone used by the user to engage with the particular website), and the user device can transmit the notification to a third party device (e.g., a device of the website administrator). In a second example, a biosignal detector, upon generation of a notification, can directly communicate the notification to the third party device. In a third example, a biosignal data device can transmit cognitive state data to a fourth party device (e.g., a fourth party remote server), the fourth party device can generate a notification based on the transmitted cognitive state data, and the fourth party device can communicate the notification to the third party device. However, any suitable device can participate in any suitable communication approach for a push configuration.

In a second variation, Block S160 can include implementing a pull configuration in notifying, where notifications can be transmitted to third parties in response to requests for notifications. Notification requests by third parties can be made within or independent from the interface provided to the third party enabling the third party to access cognitive state data. In an example, a biosignal detector can record events concerning the cognitive state data generated for a user. Through the interface provided to the third party, the third party can request a log of such events to become notified of such events. Events and/or other notification information can be handled by a third party content providing source (e.g., used in tailoring content to be subsequently presented to the user). However, any suitable device can participate in any suitable communication approach for a pull configuration.

5.9 Associating Cognitive State Data with a Content Stream.

Block S170 recites: associating cognitive state data with a content stream S170, which functions to annotate content streams and/or portions of content streams with data indicating user cognitive states. Types of content streams can include: media (e.g., self-captured video, other video, images, etc.), social network streams (e.g., social network friend updates, etc.), news streams, notification streams (e.g., streams of notifications at a user device, at a biosignal detector, etc.), calendar event streams, and/or any suitable type of content stream. However, any type of cognitive state data, supplemental data, and/or other data can be associated with any suitable content stream possessing any suitable characteristic.

In relation to Block S170, associating cognitive state data with a content stream can be performed based on tagging (e.g., tagging content streams with cognitive state metrics, cognitive states, etc.), uploading to the content source associated with the content stream (e.g., uploads to a social network presenting a social network content stream to be associated with a corresponding cognitive state data), and/or through any suitable manner. In a variation, associating cognitive state data with a content stream can additionally or alternatively include: automatically collecting, at the biosignal detector, a supplemental bioelectrical signal dataset over a first timeframe; generating a cognitive state metric based on the supplemental bioelectrical signal data set; associating the cognitive state metric with a content stream corresponding to the first timeframe, the content stream associated with the user, wherein the tailored content is based on the cognitive state metric, the content stream, and the association between the cognitive state metric and the content stream. However, associating cognitive state data with a content stream can otherwise be performed.

The content stream of Block S170 preferably corresponds to a time frame (e.g., a time period in which the content stream was captured, a time frame corresponding to the time period in which bioelectrical signal data is collected for a user interacting with the content stream, etc.) but can alternatively be independent of a time frame. The time frame associated with the content stream can be the same, different, and/or overlapping with the time frame corresponding to bioelectrical signal dataset collected as a user interacts with content. In an example of Block S170, a single bioelectrical signal dataset is associated with both the content stream and a user interaction with third party content distinct from the content stream. In a specific example, a content stream is a user's video recording of themselves playing a video game, where the video game is the third party content that the user is engaging. During this time frame, the user can be coupled to a biosignal detector that collects a single bioelectrical signal dataset associated with the video recording content stream, and with the user's interactivity with the video game. Bioelectrical signal datasets can be collected during the entirety or for portions of the content stream time frame. Further, bioelectrical signal datasets can be associated with content streams before, during, and/or after capture or presentation of the content streams. However, the content stream and/or corresponding bioelectrical signal dataset can otherwise be associated with any suitable time frame.

Block S170 can include generating databases that include content streams associated (e.g., tagged) with cognitive state data. In Block S170, the databases can be defined based on user information, content information, cognitive state data, supplemental data, tag characteristics, and/or other criteria. Such content stream databases can be searched by suitable parties based on the tagging of the content streams. However, any suitable database can be defined including any suitable content stream associated with cognitive state data, and such databases can be used for any suitable purpose.

In a first variation, Block S170 can include tagging a video content stream with cognitive state data. Specific time points, time periods, and/or the entire content stream can be tagged with any portion or the entirety of the cognitive state data. Tagging can be manual (e.g., a party can select portions of the video to tag with cognitive states corresponding to the time frames of the portions, etc.), automatic (e.g., a fourth party remote server can automatically tag portions of the content stream based on mapping time stamps of the cognitive state data to time stamps of the content stream), and/or otherwise performed. In a first specific example, a user who has used cognitive state data to tag their performances in various sporting events can search the database for the instances in which the cognitive state metrics indicated a high focus from the user. In a second specific example, a skier video-records him or herself skiing down snow slopes while cognitive state data is generated for the skier. The video recording content stream can be annotated with the cognitive state data, indicating when a user experienced the most excitement (e.g., when the skier is making sharp turns). Such analysis can be leveraged by a third-party skiing equipment vendor who is managing a e-commerce store frequently visited by the skier. Skiing equipment tailored for the user (e.g., for making sharp turns) can be presented to the skier in lieu of other types of equipment. However, cognitive state data can otherwise be used for tagging video content streams, and the tags can be used for any other suitable purpose.

In a second variation, Block S170 can include associating cognitive state with a social network content stream. Cognitive state data and/or cognitive states indicated by such data can be associated with posts (e.g., friend posts, media posts, news posts, etc.) in the content stream, user actions affecting the content stream (e.g., a user associating their cognitive state with a user video upload to the social network website). Cognitive state data associated with social network content streams can be transmitted to parties associated with the social network and/or other content source providers. Parties can subsequently analyze the cognitive state data in the context of the social network content stream, tailor content based on the analysis, and bioelectrical signal data can subsequently be automatically collected as users engage the tailored content. In a specific example, analysis of a user's cognitive state data associated with the user's social network content stream can indicate that a user's cognitive state has been positive when viewing friends' photos of nature and nature activities. The social network can leverage this cognitive state data to include more nature-based content in the content stream presented to the user. Other content source providers can utilize this data in selecting nature-based content (e.g., website content, advertisements, etc.) tailored to the user. However, cognitive state data can otherwise be associated with a social network content stream, and can be used for any other suitable purpose.

The method 100 and system 300 of the preferred embodiment and variations thereof can be embodied and/or implemented at least in part as a machine configured to receive a computer-readable medium storing computer-readable instructions. The instructions are preferably executed by computer-executable components preferably integrated with the system 300 and one or more portions of a processor, a controller, and/or other system components. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the field of biosignals will recognize from the previous detailed description and from the figures and claims, modifications and changes can be made to the preferred embodiments of the invention without departing from the scope of this invention defined in the following claims.

We claim:

1. A method, comprising:
  establishing contact between a biosignal detector and a user;
  receiving a first set of cognitive state data parameters associated with the biosignal detector;
  receiving a second set of cognitive state data parameters from a third-party, the second set of cognitive state data parameters comprising a data structure type for cognitive state data and a timing rule for cognitive state data generation;
  receiving a third set of cognitive state data parameters associated with the user;
  automatically collecting, at the biosignal detector, a bioelectrical signal dataset from a plurality of head regions of the user as the user is engaged with a stimulus provided by the third-party;
  using a first model, generating the cognitive state data for the user based on the bioelectrical signal dataset and the third set of cognitive state data parameters associated with the user, according to the first set of cognitive state data parameters and the second set of cognitive state data parameters;
  collecting a set of training data, wherein collecting the set of training data comprises: for each training user of a set of training users, collecting training data while the training user is engaged with a training stimulus and while a biosignal detector contacts the training user, wherein the training data comprises a response to the training stimulus and cognitive state data for the training user;
  using a second model, classifying the user as a user group of a set of user groups based on the cognitive state data for the user, wherein the second model is a machine learning model trained to predict user groups using the set of training data, wherein the set of user groups is generated by segmenting the set of training users into the set of user groups based on the set of training data; and
  predicting a preference for the user based on the user group.

2. The method of claim 1, wherein the plurality of head regions are associated with a plurality of brain lobes of the user.

3. The method of claim 2, wherein at least two brain lobes of the plurality of brain lobes are associated with a common brain hemisphere of the user.

4. The method of claim 1, further comprising, using a third model, classifying the user as a second user group of a second set of user groups based on the cognitive state data for the user.

5. The method of claim 4, wherein the third model is trained using a second set of training data comprising, for each of the set of training users, the cognitive state data for the training user and a second response to the training stimulus for the training user.

6. The method of claim 1, generating the set of user groups comprises, for each training user of the set of training users:
  classifying a cognitive state of the training user based on the response to the training stimulus for the training user; and
  segmenting the set of training users into the user groups based on the cognitive state classifications.

7. The method of claim 1, wherein, for each training user, the response to the training stimulus comprises a manual input from the training user associated with a cognitive state, wherein the set of user groups is generated based on the manual inputs.

8. The method of claim 1, wherein, for each training user, the training stimulus comprises a training stimulus provided by the third-party.

9. The method of claim 1, wherein generating cognitive state data for the user comprises processing the bioelectrical signal dataset using the first model, wherein the cognitive state data comprises the processed bioelectrical signal dataset.

10. The method of claim 1, further comprising: determining personalized content for the user based on the predicted preference; and presenting the personalized content to the user.

11. A system, comprising:
  a biosignal detector comprising a plurality of bioelectric signal sensors, the plurality of bioelectric signal sensors configured to automatically collect a bioelectrical signal dataset from a plurality of brain lobes of a user in response to a stimulus provided by a third-party, wherein the biosignal detector is associated with a first set of cognitive state data parameters; and
  a processing system configured to:
    receive a second set of cognitive state data parameters from the third-party, the second set of cognitive state data parameters comprising a data structure type and a timing rule for cognitive state prediction;
    receive a third set of cognitive state data parameters associated with the user;
    using a model, predict a cognitive state for the user based on the bioelectrical signal dataset for the user and the third set of cognitive state data parameters associated with the user, according to the first set of cognitive state data parameters and the second set of cognitive state data parameters, wherein the model is trained using a set of training data comprising, for each of a set of training users, a bioelectrical signal dataset for the training user and a cognitive state classification for the training user, wherein training the model comprises:

for each training user in the set of training users, selecting a user group from a set of user groups based on the set of training data; and training the model to predict, for each training user in the set of training users, the user group for the training user based on the bioelectrical signal dataset for the training user.

12. The system of claim 11, further comprising a user interface configured to present personalized content to the user, wherein the personalized content is determined based on the predicted cognitive state for the user.

13. The system of claim 11, wherein the model comprises a machine learning model.

14. The system of claim 13, wherein the model is trained using a regularization method.

15. The system of claim 11, wherein predicting a cognitive state for the user comprises: using the model, classifying the user as a user group in the set of user groups; and determining the cognitive state for the user based on the user group classification.

16. The system of claim 11, wherein the processing system is further configured to, using a second model, predict a second cognitive state for the user based on the bioelectrical signal dataset for the user, wherein the second model is trained using a second set of training data comprising, for each of the set of training users, the bioelectrical signal dataset for the training user and a second cognitive state classification for the training user, wherein training the second model comprises:

for each training user in the set of training users, selecting a second user group from a second set of user groups based on the second set of training data; and training the model to predict, for each training user in the set of training users, the second user group for the training user based on the bioelectrical signal dataset for the training user.

17. The system of claim 11, wherein, for each training user in the set of training users, the user group is selected based on the cognitive state classification for the training user.

18. The system of claim 11, wherein the cognitive state classification for each of the set of training users comprises a survey response.

19. The system of claim 11, wherein the biosignal detector does not obstruct a sense of smell of the user.

* * * * *

UNITED STATES PATENT AND TRADEMARK OFFICE
CERTIFICATE OF CORRECTION

| | | |
|---|---|---|
| PATENT NO. | : 12,461,595 B2 | Page 1 of 1 |
| APPLICATION NO. | : 18/386907 | |
| DATED | : November 4, 2025 | |
| INVENTOR(S) | : Tan Le and Geoffrey Mackellar | |

It is certified that error appears in the above-identified patent and that said Letters Patent is hereby corrected as shown below:

On the Title Page

Column 1, (73) Assignee, Line 1, Delete "1nc.," and insert --Inc.,-- therefor

Signed and Sealed this
Ninth Day of December, 2025

John A. Squires
*Director of the United States Patent and Trademark Office*